(12) United States Patent
You et al.

(10) Patent No.: US 11,884,138 B2
(45) Date of Patent: Jan. 30, 2024

(54) VEHICLE AIR CONDITIONER AND CONTROL METHOD THEREOF

(71) Applicant: Hanon Systems, Daejeon (KR)

(72) Inventors: Jae-Chun You, Daejeon (KR); Yo Chan Min, Daejeon (KR); Tae Yong Park, Daejeon (KR)

(73) Assignee: Hanon Systems, Daejeon (KR)

( * ) Notice: Subject to any disclaimer, the term of this patent is extended or adjusted under 35 U.S.C. 154(b) by 0 days.

(21) Appl. No.: 17/909,275

(22) PCT Filed: Mar. 5, 2021

(86) PCT No.: PCT/KR2021/002770
§ 371 (c)(1),
(2) Date: Sep. 2, 2022

(87) PCT Pub. No.: WO2021/177790
PCT Pub. Date: Sep. 10, 2021

(65) Prior Publication Data
US 2023/0086817 A1    Mar. 23, 2023

(30) Foreign Application Priority Data

Mar. 6, 2020 (KR) .................. 10-2020-0028160
Mar. 6, 2020 (KR) .................. 10-2020-0028191

(51) Int. Cl.
*B60H 1/32* (2006.01)
*B60H 1/22* (2006.01)
*B60H 3/06* (2006.01)

(52) U.S. Cl.
CPC ............ *B60H 1/3227* (2013.01); *B60H 1/22* (2013.01); *B60H 3/06* (2013.01)

(58) Field of Classification Search
CPC .... B60H 1/3227; B60H 1/22; B60H 1/00057; B60H 1/32331; B60H 2001/00085;
(Continued)

(56) References Cited

U.S. PATENT DOCUMENTS

2010/0212347 A1    8/2010 Kim et al.
2017/0350624 A1*  12/2017 Kawakubo ............. F25B 41/22
2021/0094391 A1*   4/2021 Miyakoshi ......... B60H 1/00485

FOREIGN PATENT DOCUMENTS

JP    2005238875 A    9/2005
JP    2006232164 A    9/2006
(Continued)

*Primary Examiner* — Marc E Norman
(74) *Attorney, Agent, or Firm* — Norton Rose Fulbright US LLP; James R. Crawford

(57) ABSTRACT

The present invention relates to a vehicle air conditioner and, more specifically, to a vehicle air conditioner which supplies, to a variable heat exchanger, condensate water and air, that have been blown by means of a supply part and passed through an evaporator, so as to enable sub-cooling and overall performance of the variable heat exchanger to be improved during cooling, thereby further increasing cooling performance, and which may use air and condensate water as a heat-absorbing heat source during heating so as to further increase the heat absorption amount of the variable heat exchanger, so that heating performance may be further increased, and thus overall power consumption for air conditioning may be reduced and an increase in heat pump system performance may be promoted.

20 Claims, 21 Drawing Sheets

(58) Field of Classification Search
CPC ........... B60H 2001/00135; B60H 2001/00214; B60H 3/06; F24F 13/22; F24F 13/222
See application file for complete search history.

(56) References Cited

FOREIGN PATENT DOCUMENTS

| | | |
|---|---|---|
| JP | 6488737 B2 | 3/2019 |
| KR | 101251206 B1 | 4/2013 |
| KR | 20200021198 A | 2/2020 |

* cited by examiner

VEHICLE AIR CONDITIONER AND CONTROL METHOD THEREOF

CROSS REFERENCE TO RELATED APPLICATIONS

This application is a national phase under 35 U.S.C. § 371 of International Application No. PCT/KR2021/002770 filed on Mar. 5, 2021, which claims benefit of priority from Korean Patent Application Nos. 10-2020-0028160 filed on Mar. 6, 2020 and 10-2020-0028191 filed on Mar. 6, 2020. The entire contents of these applications are incorporated herein by reference in their entirety.

TECHNICAL FIELD

The present invention relates to a vehicle air conditioner and a control method thereof, and more particularly, to a vehicle air conditioner which may supply a heat exchanger with air and condensate water passing through an evaporator and blown by means of a supply part to improve sub-cooling and overall performance of the heat exchanger during air cooling, thereby further increasing its cooling performance, and which may use air and condensate water as a heat-absorbing heat source during air heating to further increase a heat absorption amount of the heat exchanger, thereby further increasing its heating performance, reducing overall power consumption for air conditioning, and promoting improved performance of a heat pump system.

BACKGROUND ART

A typical vehicle air conditioner system may include the followings connected by a refrigerant pipe: a compressor compressing and delivering a refrigerant, a condenser condensing a high-pressure refrigerant delivered from the compressor, an expansion means throttling the refrigerant condensed and liquefied by the condenser, and an evaporator evaporating the low-pressure liquid refrigerant throttled by the expansion means by exchanging heat with air blown to a vehicle interior, to cool air discharged to the vehicle interior by using heat absorption by latent heat released when the refrigerant is evaporated, and the like.

The evaporator may be installed in an air conditioning case installed in the vehicle interior and serve to cool the interior. That is, the vehicle interior may be cooled when air blown by a blower is cooled by the latent heat which is released when the liquid refrigerant circulated in the evaporator is evaporated, while passing through the evaporator, and cold air is discharged to the vehicle interior.

In addition, the vehicle interior may be heated using a heater core which is installed in the air conditioning case and in which an engine coolant is circulated, or an electric heating type heater installed in the air conditioning case.

Meanwhile, the condenser may be installed on a front portion of a vehicle to dissipate heat while exchanging heat with air.

Recently developed is a heat pump system that performs air cooling and heating by using only a refrigeration cycle. As shown in FIG. 1, the heat pump system may include a cold air passage 11 and a hot air passage 12 which are partitioned in one air conditioning case 10, an evaporator 4 for air cooling which is installed in the cold air passage 11 and a condenser 2 for air heating which is installed in the hot air passage 12. Here, an air outlet 15 for supplying air to the vehicle interior and an air discharge 16 for discharging air to a vehicle exterior may be positioned at an outlet of the air conditioning case 10. In addition, blowers 20 individually operated may respectively be installed at inlets of the cold air passage 11 and the hot air passage 12.

Therefore, in an air cooling mode, cold air cooled while passing through the evaporator 4 of the cold air passage 11 may be discharged to the vehicle interior through the air outlet 15 to cool the interior. Here, hot air heated while passing through the condenser 2 of the hot air passage 12 may be discharged to the vehicle exterior through the air discharge 16.

In an air heating mode, hot air heated while passing through the condenser 2 of the hot air passage 12 may be discharged to the vehicle interior through the air outlet 15 to heat the interior. Here, cold air cooled while passing through the evaporator 4 of the cold air passage 11 may be discharged to the vehicle exterior through the air discharge 16.

However, in the prior art, the blowers 20 may respectively be positioned in the cold air passage 11 and the hot air passage 12, air passing through the condenser 2 or the evaporator 4 may be required to be discharged through the air discharge based on an air cooling or heating setting, and the air discharge 16 equipped with a control door may thus be inevitably positioned in each of two places. Therefore, the heat pump system may inevitably have an increased overall size.

In addition, the condenser 2 installed in the air conditioning case may have low condensing performance due to its inevitably small size. Therefore, the heat pump system may have a problem in its cooling performance.

RELATED ART DOCUMENT

Patent Document

Patent Document 1: Korean Patent No. 10-1251206 (entitled, "AIR-CONDITIONER WITHOUT STARTING THE ENGINE FOR VEHICLE")

DISCLOSURE

Technical Problem

An object of the present invention is to provide a vehicle air conditioner which may supply a heat exchanger with air and condensate water passing through an evaporator and blown by means of a supply part to reduce overall power consumption for air conditioning and promote improved performance of a heat pump system.

In more detail, an object of the present invention is to provide a vehicle air conditioner which may improve sub-cooling and overall performance of the heat exchanger during air cooling, thereby further increasing its cooling performance, and which may use air and condensate water as a heat-absorbing heat source during air heating to further increase a heat absorption amount of the heat exchanger, thereby further increasing its heating performance.

Another object of the present invention is to provide a vehicle air conditioner and a control method thereof, in which the vehicle air conditioner may selectively supply a variable heat exchanger with air passing through an interior heat exchanger by means of a supply part to use air as a heat-absorbing heat source during air heating and prevent the variable heat exchanger from adhering to the air conditioner, thereby reducing overall power consumption for air conditioning, and promoting improved performance of a heat pump system.

Technical Solution

In one general aspect, a vehicle air conditioner 1000 which is an air conditioner having an interior heat exchanger 120 for air heating, a variable heat exchanger 140 for condensing a refrigerant during air cooling and evaporating the refrigerant during air heating and an evaporator 130 for the air cooling built therein, in a refrigerant loop configured of a compressor 200, an interior heat exchanger 120, a first expansion means 300, a variable heat exchanger 140, a second expansion means 150 and an evaporator 130, includes a supply part 500 for supplying air passing through the evaporator 130 and condensate water generated in the evaporator 130 to the variable heat exchanger 140.

In addition, in the vehicle air conditioner 100, a certain region of the variable heat exchanger 140 may be positioned below the evaporator 130 in a height direction.

In addition, in the vehicle air conditioner 100, condensate water and air may be supplied to a side of the variable heat exchanger 140, where the refrigerant is discharged, by means of the supply part 500.

In addition, the vehicle air conditioner 100 may include a variable heat exchanger module A1 and an air conditioning module A2 assembled and fixed to each other, the variable heat exchanger module A1 including a first air conditioning case 110*a*, the variable heat exchanger 140 which is positioned in the first air conditioning case 110*a*, and a fan assembly 161 which is mounted in the first air conditioning case 110*a* to deliver wind, and the air conditioning module A2 including a second air conditioning case 110*b* which communicates with a vehicle interior and in which wind for conditioning interior air flows, a blower part 162 which is positioned in the second air conditioning case 110*b* to deliver wind, the evaporator 130 and the interior heat exchanger 120.

In addition, in the first air conditioning case 110*a*, a discharge part through which condensate water is discharged may be positioned at a lower side of the variable heat exchanger 140.

In addition, in the vehicle air conditioner 100, a region where the blower part 162 of the air conditioning module A2 is positioned and the variable heat exchanger module A1 may be mounted in an engine room to be parallel to each other in a vehicle width direction.

In addition, the supply part 500 may include an extension part 510 which is extended from the second air conditioning case 110*b* and to which condensate water and air are delivered, and a first fastening part 521 and a second fastening part 522 respectively positioned in the first air conditioning case 110*a* and the extension part 510 to be fastened to each other.

In addition, the extension part 510 may include an inclined surface 511 extended from the second air conditioning case 110*b* below the evaporator 130 while being inclined downward in a vehicle height direction, a support part 512 protruding from the inclined surface 511 to support a lower side of the evaporator 130, and a first inclined part 513 and a second inclined part 514 obliquely connecting the support part 512 and the inclined surface 511 to each other, respectively on both sides of the support part 512 in the vehicle width direction.

In addition, in the supply part 500, the first fastening part 521 may have a certain through region, and the second fastening part 522 may protrude from the extension part 510 to be inserted and fixed into the variable heat exchanger module A1 through the first fastening part 521.

In addition, the plurality of first fastening parts 521 and the plurality of second fastening parts 522 may be spaced apart from each other, respectively, in the vehicle width direction.

In addition, in the variable heat exchanger module A1, positioned are a first exterior air inlet 116 through which exterior air is introduced into the first air conditioning case 110*a*, an engine room air inlet 117 which communicates with an engine room, and a first control door 191 which controls the opening and closing of the first exterior air inlet 116 and the engine room air inlet 117.

In addition, in the air conditioning module A2, positioned are a second exterior air inlet 114 through which exterior air is introduced into the second air conditioning case 110*b*, an interior air inlet 115 through which the interior air is introduced, and a second control door 192 which controls the opening and closing of the second exterior air inlet 114 and interior air inlet 115.

In addition, the air conditioning module A2 may further include a filter 180 positioned downstream of the second control door 192 in an air flow direction.

In addition, the air conditioning module A2 may further include an auxiliary heating heat exchanger 170 positioned downstream of the interior heat exchanger 120 in an air flow direction.

In addition, the supply part 500 may selectively supply air passing through the interior heat exchanger 120 to the variable heat exchanger 140.

In addition, in the vehicle air conditioner 100, air passing through the interior heat exchanger 120 may be supplied by means of the supply part 500 to be used as a heat-absorbing heat source during the air heating or when the variable heat exchanger 140 adheres thereto.

In addition, the vehicle air conditioner 100 may include a variable heat exchanger module A1 and an air conditioning module A2 assembled and fixed to each other, the variable heat exchanger module A1 including a first air conditioning case 110*a*, the variable heat exchanger 140 which is positioned in the first air conditioning case 110*a*, and a fan assembly 161 which is mounted in the first air conditioning case 110*a* to deliver wind, and the air conditioning module A2 including a second air conditioning case 110*b* which communicates with a vehicle interior and in which wind for conditioning interior air flows, a blower part 162 which is positioned in the second air conditioning case 110*b* to deliver wind, the evaporator 130 and the interior heat exchanger 120, and the supply part 500 includes a through hole 515 which is a certain through region of the second air conditioning case 110*b*, a third control door 540 which controls the opening and closing of the through hole 515, a communication part 516 which communicates with the through hole 515 and delivers air passing through the interior heat exchanger 120, and first and second fastening parts 521 and 522 which are respectively positioned in the first air conditioning case 110*a* and the communication part 516 to be fastened to each other.

In another general aspect, a control method for the vehicle air conditioner 100 includes: determining whether the third control door 540 needs to be opened (S10); and opening the third control door 540 (S20).

In addition, in the determining (S10), it may be determined that the third control door 540 needs to be opened when an air heating setting is confirmed.

In addition, in the determining (S10), it may be determined whether the third control door 540 needs to be opened, by including checking whether an exterior temperature is within a certain temperature range (S11); and checking whether a measured humidity is equal to or greater than certain humidity (S12).

Advantageous Effects

As set forth above, the vehicle air conditioner according to the present invention may supply the heat exchanger with air and condensate water passing through the evaporator and blown by means of the supply part to reduce the overall power consumption for air conditioning and promote the improved performance of the heat pump system.

In more detail, the vehicle air conditioner according to the present invention may improve the sub-cooling and overall performance of the heat exchanger during the air cooling, thereby further increasing its cooling performance, and use air and condensate water as the heat-absorbing heat source during the air heating to further increase the heat absorption amount of the heat exchanger, thereby further increasing its heating performance.

In particular, the vehicle air conditioner of the present invention may induce the sub-cooling during the air cooling by supplying condensate water and air to the lower side of the heat exchanger, where the refrigerant passing through the heat exchanger is discharged, by means of the supply part, and the plurality of fastening parts are spaced apart from each other in the vehicle width direction to evenly supply condensate water and air to the lower region of the heat exchanger, thereby promoting the improvement of the heat pump system.

In addition, in the vehicle air conditioner of the present invention, the fastening parts may be simply assembled to each other by assembling the heat exchanger module and the air conditioning module to each other.

In addition, the vehicle air conditioner and a control method thereof according to the present invention may selectively supply the variable heat exchanger with air passing through the interior heat exchanger by means of the supply part to use air as the heat-absorbing heat source during the air heating and prevent the adhesion of the variable heat exchanger, thereby reducing the overall power consumption for air conditioning, and promoting the improved performance of the heat pump system.

BEST MODE

Hereinafter, a vehicle air conditioner 100 having the configuration as described above will be described in detail with reference to the accompanying drawings.

First Exemplary Embodiment

Figure 1:
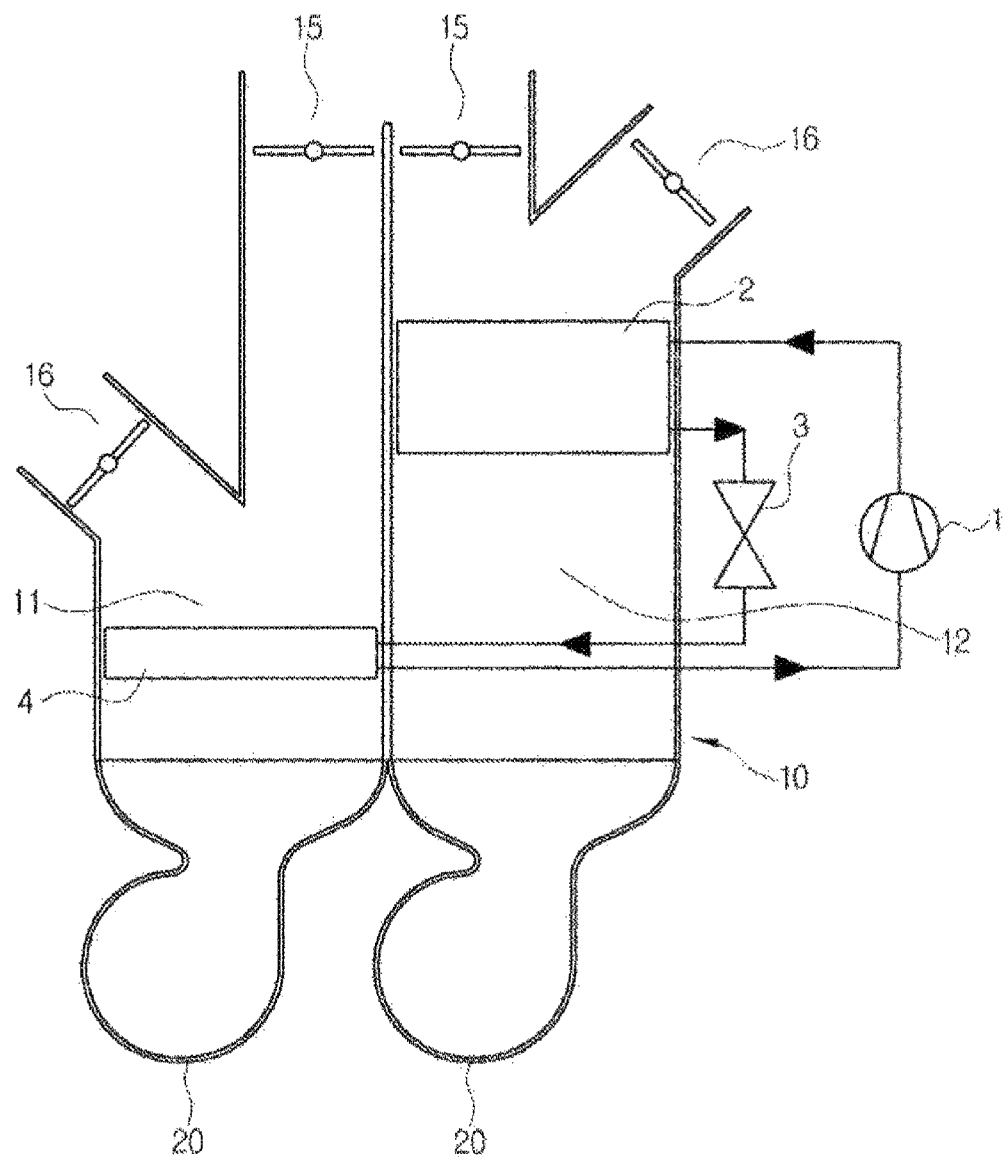
FIG. 1 is a view showing a prior vehicle heat pump system.
Figure 2:
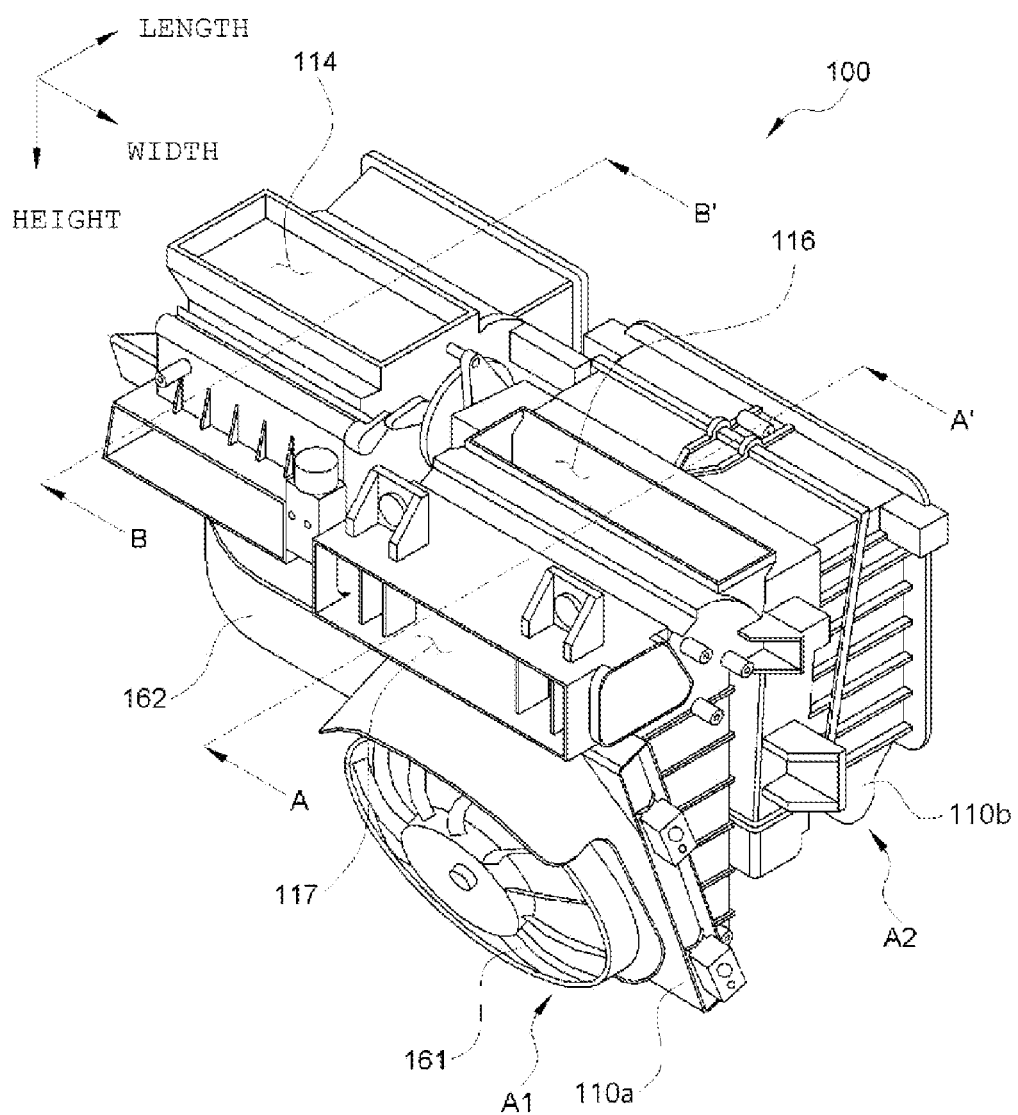
FIG. 2 is a perspective view of a vehicle air conditioner according to a first exemplary embodiment of the present invention.
Figure 3:
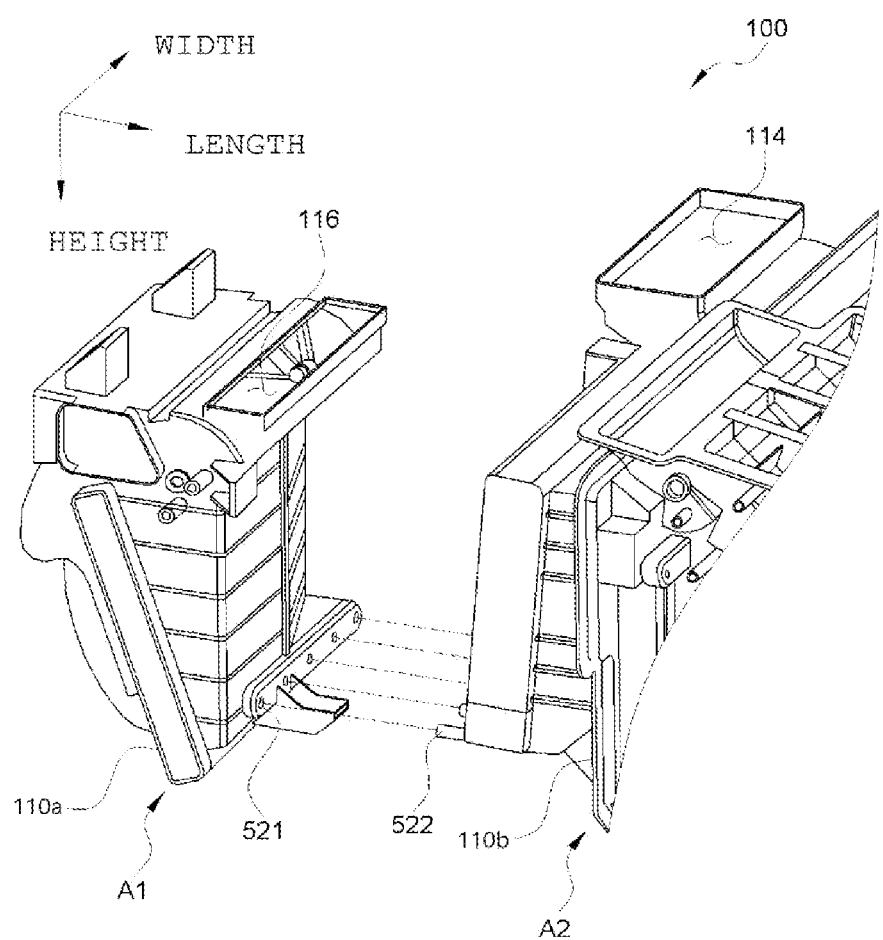
FIGS. 3 to 5 are exploded perspective views of the vehicle air conditioner according to the first exemplary embodiment of the present invention in different directions.
Figure 4:
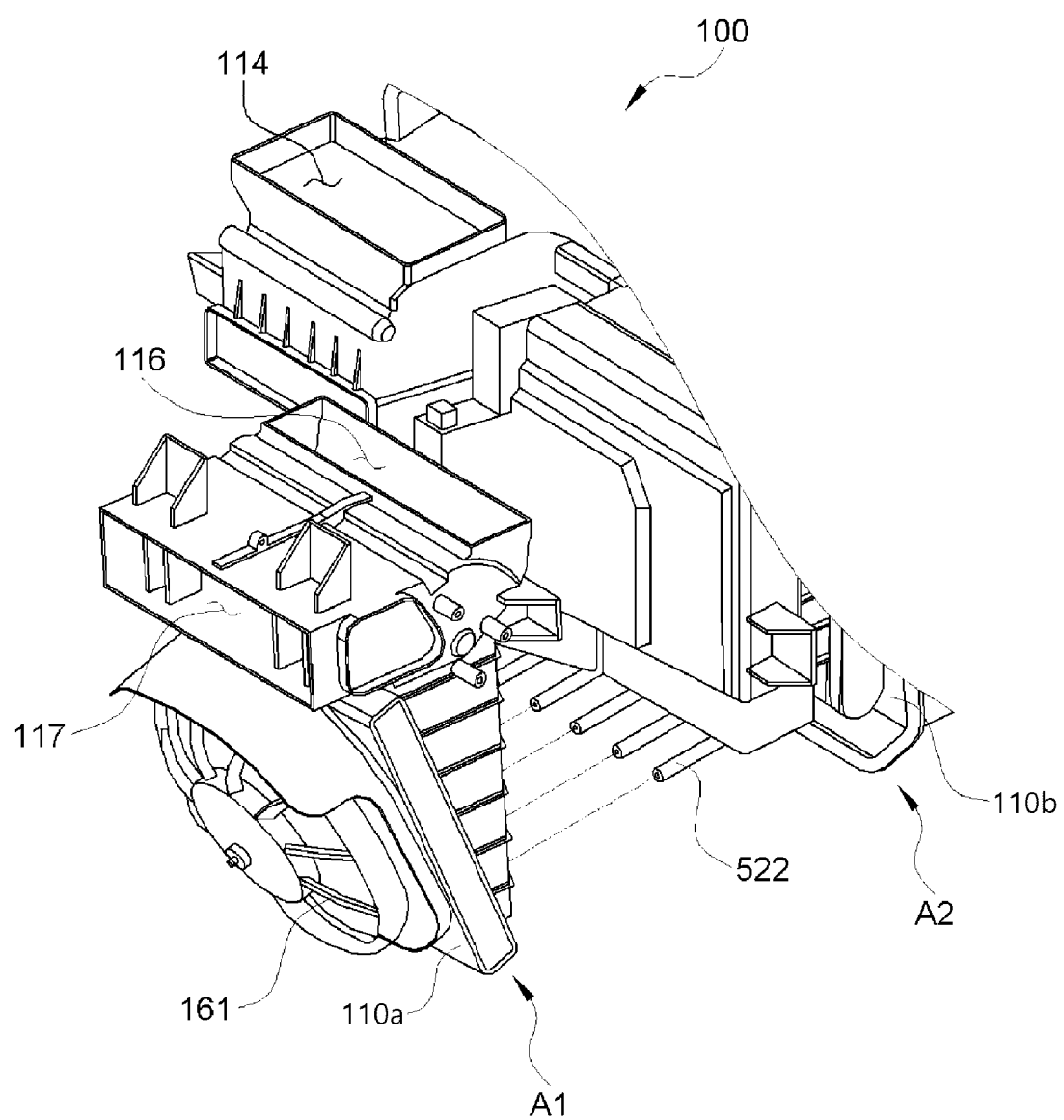
Figure 5:
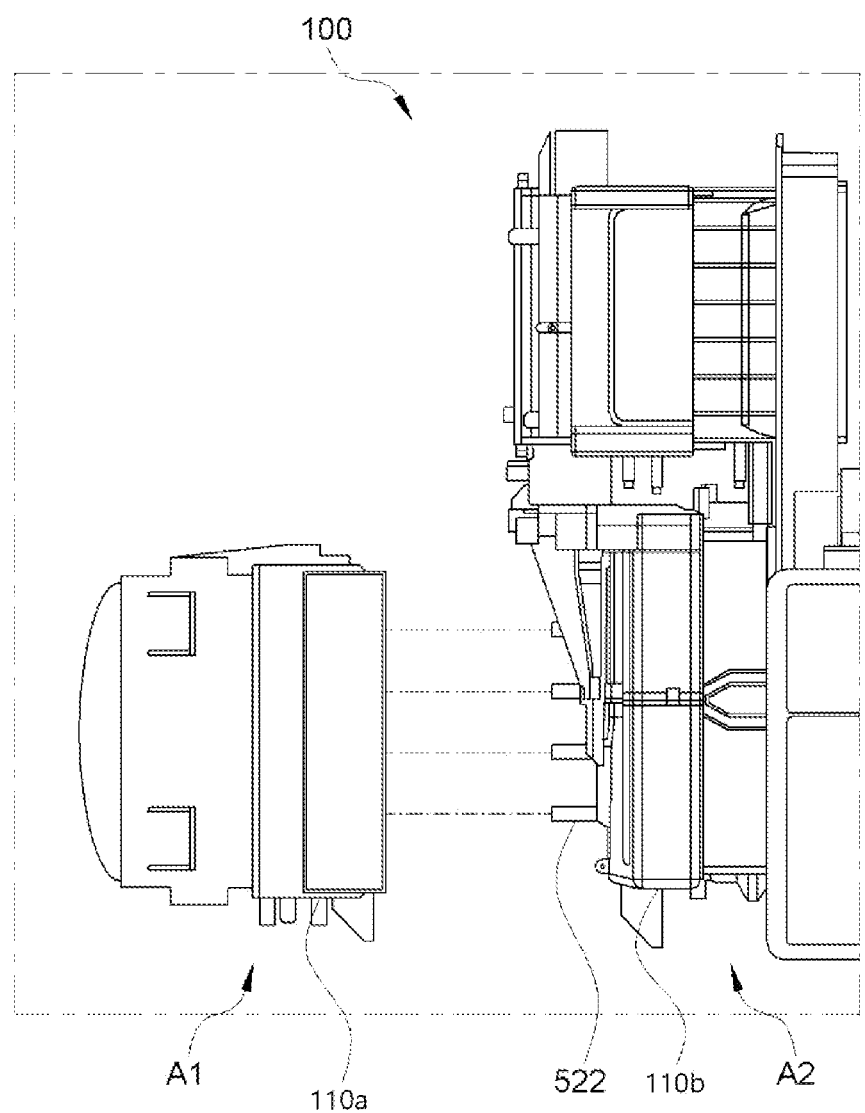
Figure 6:
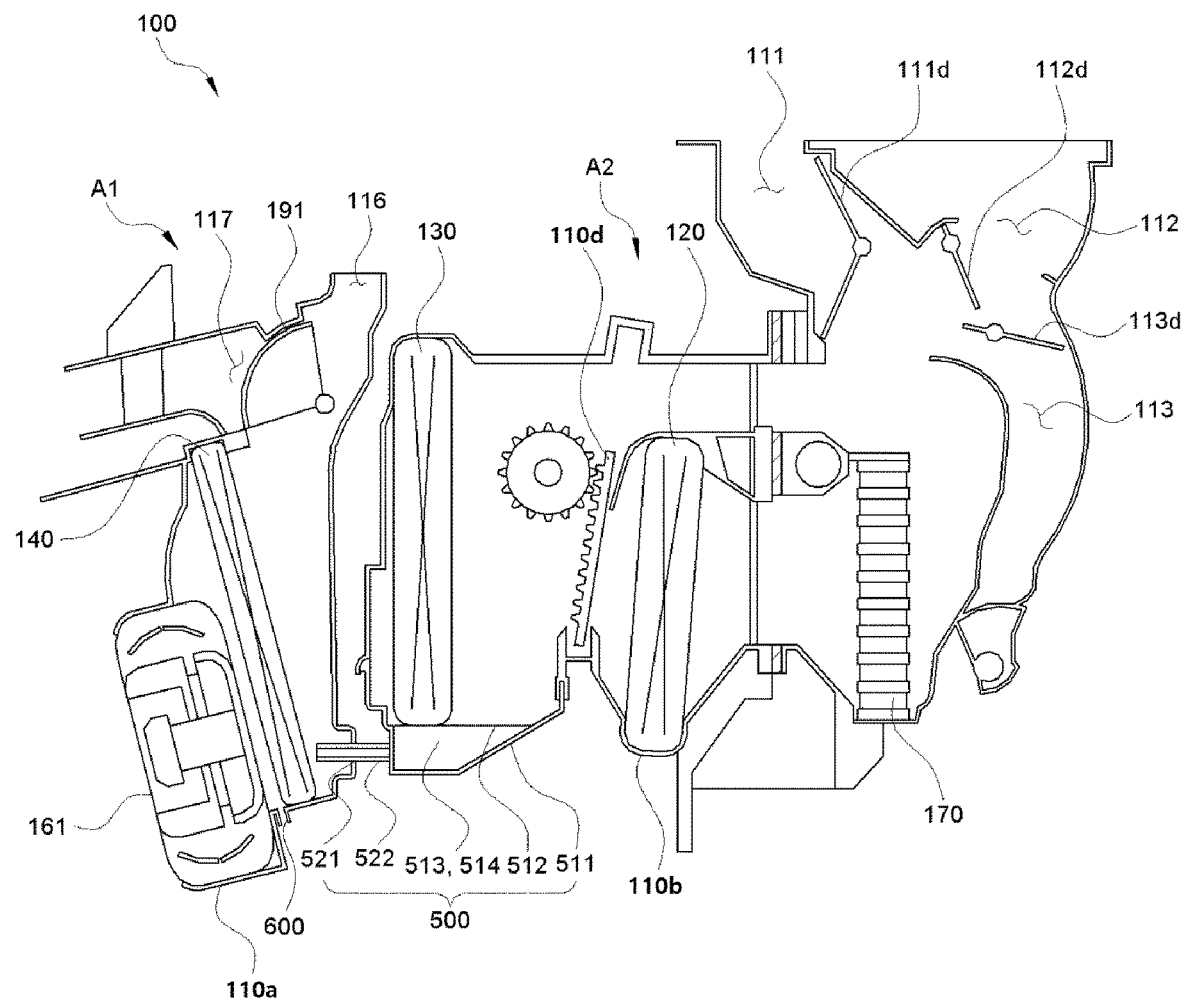
FIGS. 6 and 7 are cross-sectional views respectively taken in direction AA' and direction BB' shown in FIG. 2.
Figure 7:
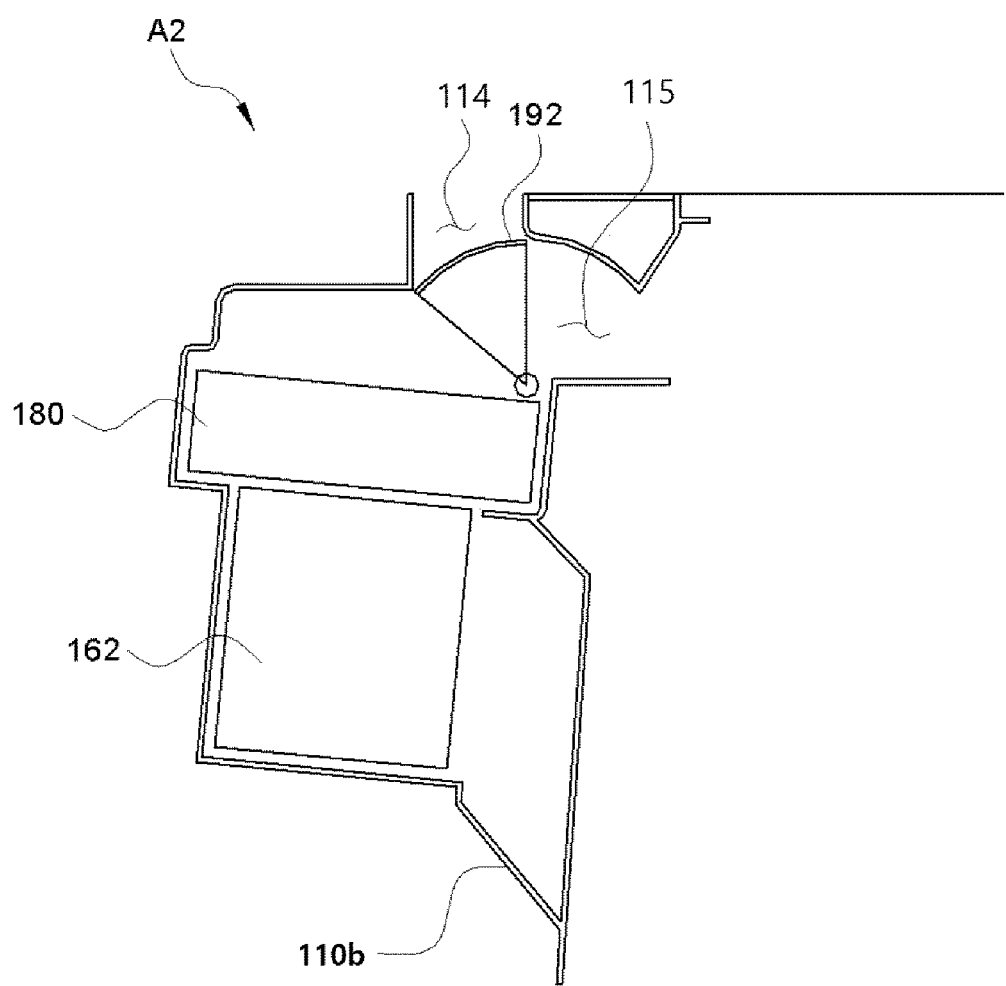
Figure 8:
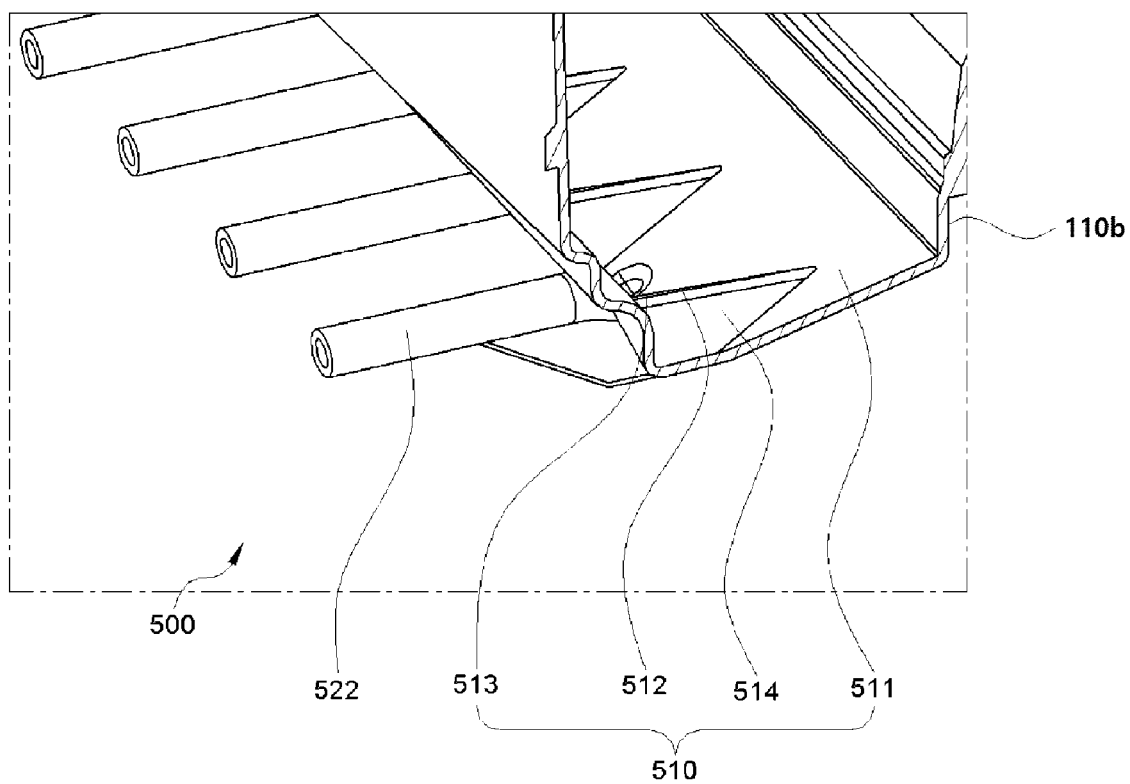
FIG. 8 is a partial cutaway perspective view showing a supply part of the vehicle air conditioner according to the first exemplary embodiment of the present invention.
Figure 9A:
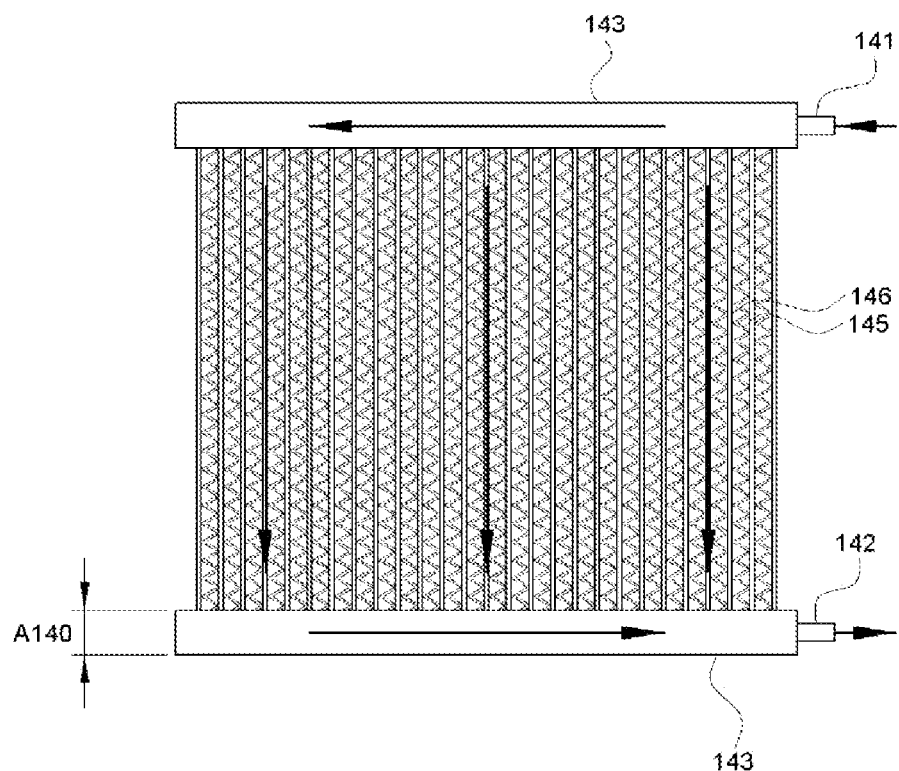
FIGS. 9A and 9B are views each showing a heat exchanger of the vehicle air conditioner according to the first exemplary embodiment of the present invention.
Figure 9B:
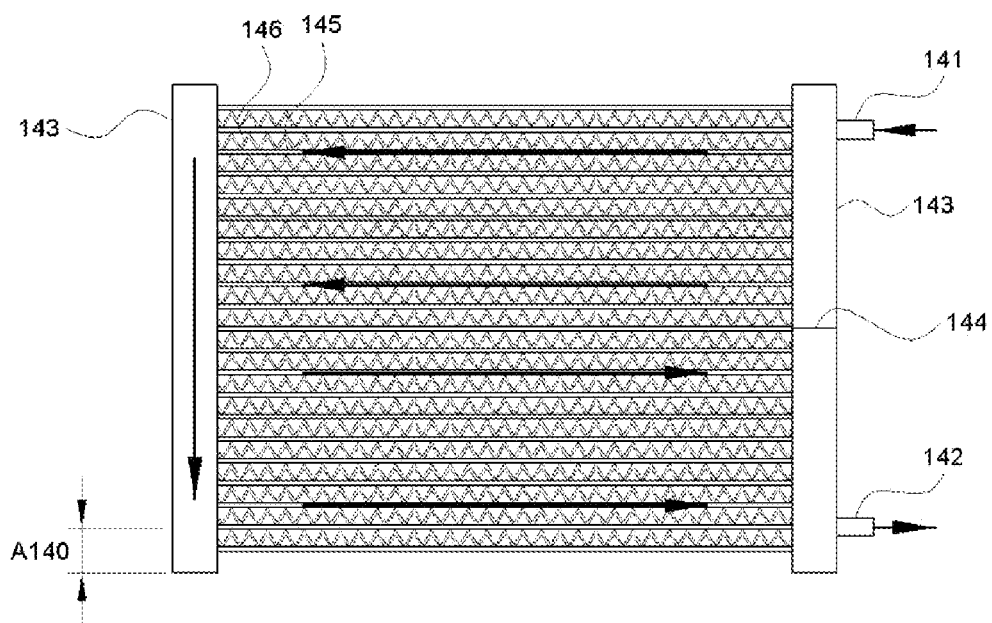
Figure 10:
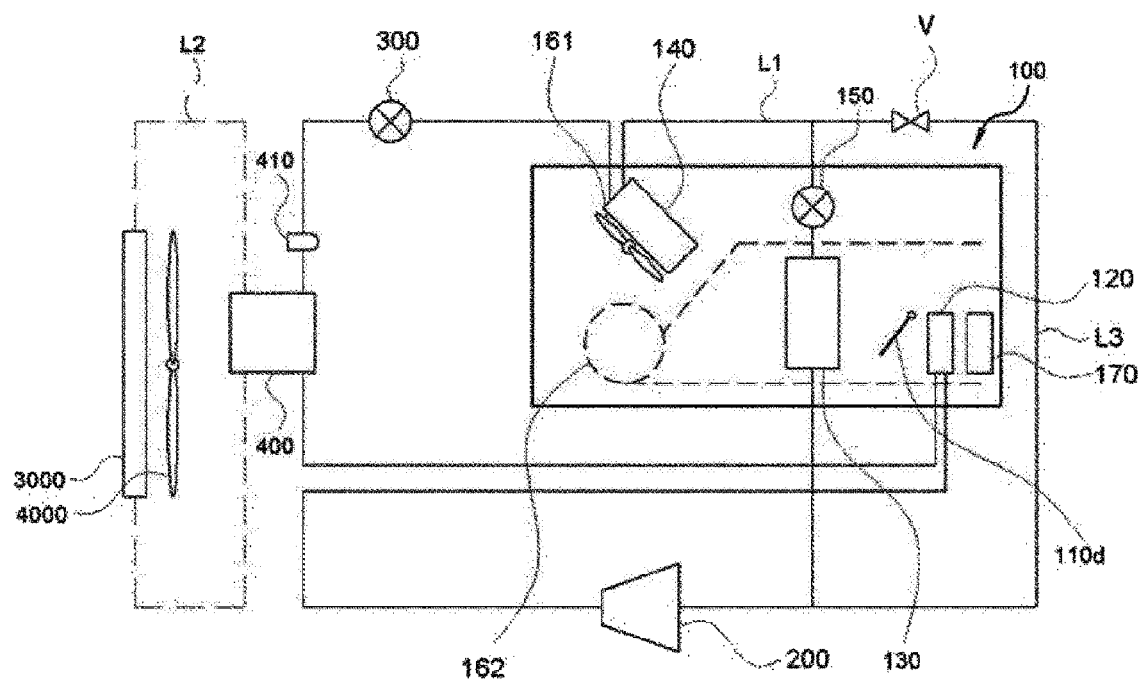
FIG. 10 is a view showing an example to which a heat pump system of the vehicle air conditioner according to the first exemplary embodiment of the present invention is applied.

FIG. 2 is a perspective view of a vehicle air conditioner according to a first exemplary embodiment of the present invention; FIGS. 3 to 5 are exploded perspective views of the vehicle air conditioner according to the first exemplary embodiment of the present invention in different directions; FIGS. 6 and 7 are cross-sectional views respectively taken in direction AA' and direction BB' shown in FIG. 2; FIG. 8 is a partial cutaway perspective view showing a supply part of the vehicle air conditioner according to the first exemplary embodiment of the present invention; FIGS. 9A and 9B are views each showing a heat exchanger of the vehicle air conditioner according to the first exemplary embodiment of the present invention; and FIG. 10 is a view showing an application example of a heat pump system of the vehicle air conditioner according to the first exemplary embodiment of the present invention.

The vehicle air conditioner 100 of the present invention may include a variable heat exchanger 140, an evaporator 130, an interior heat exchanger 120 and a supply part 500.

The variable heat exchanger 140 may condense a refrigerant based on an air cooling setting, or evaporate the refrigerant based on an air-heating setting. That is, the variable heat exchanger 140 may not cool or heat air for actual air cooling or heating, and condense the refrigerant supplied to the evaporator 130 based on the air cooling setting or evaporate the refrigerant supplied to the interior heat exchanger 120 based on the air-heating setting. The description below describes again a flow of the refrigerant based on the air cooling or heating setting of the actual heat pump system and a change in the refrigerant while passing through each component.

The evaporator 130 may cool air discharged to a vehicle interior. Here, when the air cooling is performed, the refrigerant in a wet state of low temperature and low pressure may be supplied to the evaporator 130, and air may be cooled while passing through the evaporator 130 to be discharged to the vehicle interior. On the other hand, when the air heating is performed, the refrigerant may not be supplied to the evaporator 130, such that even though air passes through the evaporator 130, an interior temperature may not be changed.

The interior heat exchanger 120 may be positioned at the rear of the evaporator 130 in a direction in which air-conditioning wind for conditioning interior air flows to heat air discharged to the vehicle interior. That is, the interior heat exchanger 120 may be a component for performing the air heating, and control the air cooling or heating by controlling a flow of air-conditioning wind passing through the interior heat exchanger 120 by using a temp door 110d.

The variable heat exchanger 140, the evaporator 130 and the interior heat exchanger 120 may be positioned in an air conditioning case for configuring the vehicle air conditioner 100. In particular, the present invention may include a first air conditioning case 110a and a second air conditioning case 110b, and a detailed description thereof is given below.

The supply part 500 may be a component for supplying air and condensate water passing through the evaporator 130 to the variable heat exchanger 140. Here, the variable heat exchanger 140 may have a "U"-shaped flow, and the supply part 500 may be placed at a position where air and condensate water passing through the evaporator 130 are supplied to a certain region in a lower side of the variable heat exchanger 140. In other words, air and condensate water may be supplied to the lower side of the variable heat exchanger 140, where the refrigerant is discharged, by means of the supply part 500, and may exchange heat with the refrigerant before being discharged, which may increase a heat exchange effect, and allow higher sub-cooling during the air cooling in particular.

FIGS. 9a and 9b are views showing examples of the variable heat exchanger 140. FIG. 9A shows an example of the variable heat exchanger including a pair of header tanks 143 positioned on upper and lower sides in the drawing while being spaced apart from each other by a certain distance, a plurality of tubes 145 connecting the header tanks to each other, and fins 146 interposed therebetween, in which the refrigerant introduced through an upper inlet pipe 141 is moved downward through the plurality of tubes 145, and discharged through a lower outlet pipe 142. FIG. 9B shows another example of the variable heat exchanger including the pair of header tanks 143 positioned on left and right sides in the drawing while being spaced apart from each other by a certain distance. Here, the right header tank 143 equipped with the inlet pipe 141 and the outlet pipe 142 may be partitioned by a baffle 144 in a height direction thereof. The refrigerant introduced into an upper region of the right header tank 143 through the inlet pipe 141 may be moved to the left header tank 143 through some of the tubes 145, and moved back to a lower region of the right header tank 143 through the rest tubes 145 and then discharged through the outlet pipe 142. Reference numeral A140 in FIGS. 9A and 9B may denote a supply region to which air and condensate water passing through the evaporator 130 is supplied by means of the supply part 500, and the supply region A140 of the supply part 500 may be positioned in the lower side of the variable heat exchanger 140. Here, the supply region of the supply unit 500 may be positioned within a range of zero (0) to 35% of the entire variable heat exchanger 140 in the height direction.

As described above, the vehicle air conditioner 100 of the present invention may use condensate water generated by the evaporator 130 and discarded to the outside, and air and condensate water passing through the evaporator 130 may be moved to the variable heat exchanger 140 through the supply part 500, thereby improving efficiency of the entire heat pump system. In particular, in an air cooling mode, condensate water and air, having a low temperature, supplied to the variable heat exchanger 140 may be used to increase a sub-cooling degree of the variable heat exchanger 140, thereby increasing its cooling performance and thus reducing cooling consumption power. In fact, condensate water and air supplied by means of the supply part 500 in the air cooling mode may respectively be 10° C. or less and 5° C. or less.

In addition, in an air heating mode, air and condensate water, having a high temperature (higher than an exterior temperature) and supplied to the variable heat exchanger 140 may be used as a heat source for absorbing heat of the variable heat exchanger 140. Here, when air passing through the evaporator 130 is supplied with (interior) air passing through the vehicle interior, air passing through the evaporator 130 may be usually higher than the exterior temperature by 10° C. or higher. This heat may be used to increase a heat absorption amount of the variable heat exchanger 140, thereby improving heating performance.

The vehicle air conditioner 100 of the present invention is not limited to any particular type, and may be variously modified as long as air passing through the evaporator 130 and condensate water generated in the evaporator 130 are supplied to the variable heat exchanger 140 by means of the supply part 500. The description below describes an example in which the entire vehicle air conditioner 100 is formed by including a variable heat exchanger module A1 and an air conditioning module A2 assembled to each other.

First, the variable heat exchanger module A1 may include the first air conditioning case 110a, the heat exchanger 140 and a fan assembly 161.

The first air conditioning case 110a may be a body of the variable heat exchanger module A1, the variable heat exchanger 140 may be positioned therein, and the fan assembly 161 may be mounted in one side thereof. The first air conditioning case 110a may include a first exterior air inlet 116 which communicates with a vehicle exterior, an engine room air inlet 117 which communicates with an engine room, and a first control door 191 which controls the opening and closing of the first exterior air inlet 116 and the engine room air inlet 117. The first control door 191 may control a flow of air passing through the variable heat exchanger 140 by controlling the opening and closing of the first outdoor air inlet 116 and the engine room air inlet 117 based on the air cooling or heating setting. In particular, in the winter when the exterior temperature is low, the inside of the engine room may be heated by operations of various electronic components and maintain a temperature higher than the exterior temperature. During maximum heating, the variable heat exchanger module A1 of the present invention may supply air in the engine room into the first air conditioning case 110a by the operation of the first control door 191 to increase the evaporation performance (or heat absorption amount) of the variable heat exchanger 140, thereby further improving the air heating performance of the interior heat exchanger 120.

In addition, in the first air conditioning case 110a, a discharge part through which condensate water is discharged may be positioned at a lower side of a region where the variable heat exchanger 140 is positioned to discharge the condensate water supplied to the variable heat exchanger 140 by means of the supply part 500.

The fan assembly 161 may be positioned in the first air conditioning case 110a and rotated based on the air cooling or heating setting to form the flow of air passing through the variable heat exchanger 140, and may include a fan part including rotor blades, and a motor controlling an operation of the fan part.

The air conditioning module A2 may include the second air conditioning case 110b, a blower part 162, the evaporator 130 and the interior heat exchanger 120.

The second air conditioning case 110b may be a body assembled with the first air conditioning case 110a to form a vehicle air conditioner 100, and may have the blower part 162, the evaporator 130 and the interior heat exchanger 120 built therein. Here, the second air conditioning case 110b may include a second exterior air inlet 114 through which exterior air is introduced, an interior air inlet 115 through which the interior air is introduced, and a second control door 192 which controls the opening and closing of the second exterior air inlet 114 and interior air inlet 115.

In addition, the temp door 110d for allowing air passing through the evaporator 130 to be mixed by passing through the interior heat exchanger 120 based on a temperature setting may be positioned in the second air conditioning case 110b, and vents 111, 112 and 113 for discharging air to the vehicle interior may each be positioned on a side of the second air conditioning case, through which air is discharged to the vehicle interior. In more detail, the vents 111, 112 and 113 each positioned on the side through which air is discharged may be a face vent 111, a defrost vent 112 and a floor vent 113, of which opening degrees are controlled by respective doors 111d, 112d and 113d.

In the vehicle air conditioner 100 of the present invention, a region where the blower part 162 of the air conditioning module A2 is positioned and the variable heat exchanger module A1 may be mounted in the engine room to be parallel to each other in a vehicle width direction. That is, the region where air flows by the blower part 162 positioned in the air conditioning module A2 (i.e., region where the second exterior air inlet 114 and the interior air inlet 115 are positioned) may be positioned to be parallel to the variable heat exchanger module A1 in the engine room.

The blower part 162 may be positioned in the second air conditioning case 110b, and may blow air for conditioning air of vehicle interior.

In addition, in the vehicle air conditioner 100 of the present invention, a filter 180 may be further positioned at the rear of the second control door 192 in an air flow direction, and the filter may be replaceable.

In addition, in the vehicle air conditioner 100 of the present invention, an auxiliary heating heat exchanger 170 may be further positioned at the rear of the interior heat exchanger 120 in the air flow direction. The auxiliary heating heat exchanger 170 may perform the air heating together with the interior heat exchanger 120, and use various types including a positive temperature coefficient (PTC) heating means.

The supply part 500 may include an extension part 510, a first fastening part 521 and a second fastening part 522 to be easily manufactured by assembling the first air conditioning case 110a of the variable heat exchanger module A1 and the second air conditioning case 110b of the air conditioning module A2 to each other.

The extension part 510 and the second fastening part 522 may be positioned in the second air conditioning case 110b, and the first fastening part 521 may be positioned in the first air conditioning case 110a. First, the extension part 510 may be a part which is extended from a lower side of the second air conditioning case 110b to which air and condensate water passing through the evaporator 130 are delivered.

The first fastening part 521 may be positioned in the first air conditioning case 110a, the second fastening part 522 may be positioned in the extension part 510 of the second air conditioning case 110b, and the fastening parts may be fastened to each other to supply condensate water and air delivered through the extension part 510 to the variable heat exchanger 140.

Here, the first fastening part 521 may be a certain through region of the first air conditioning case 110a, and the second fastening part 522 may protrude long from the extension part 510 and may be inserted and fixed into the first air conditioning case 110a through the first fastening part 521. The supply part 500 may be easily manufactured by assembling the first air conditioning case 110a and the second air conditioning case 110b to each other.

In addition, the extension part 510 may include an inclined surface 511 extended from the second air conditioning case 110b below the evaporator 130 while being inclined downward in a vehicle height direction, a support part 512 protruding from the inclined surface 511 in the vehicle width direction to support the lower side of the evaporator 130, and a first inclined part 513 and a second inclined part 514 obliquely connecting the support part 512 and the inclined surface 511 to each other, respectively on both sides of the support part 512 in the vehicle width direction, respectively, to easily supply condensate water and air to the variable heat exchanger 140 while supporting the evaporator 130.

The inclined surface 511 is a portion extended below the evaporator 130, and inclined downward in a direction in which the variable heat exchanger 140 is positioned and downward in the vehicle height direction.

The support part 512 may protrude from the inclined surface 511 to support the evaporator 130, and the plurality of support parts 512 may be provided in the vehicle width direction.

The first inclined part 513 and the second inclined part 514 may support both the sides of the support part 512 in the vehicle width direction, obliquely connect the support part 512 and the inclined surface 511 to each other, respectively, and deliver the condensate water generated in the evaporator 130 to the variable heat exchanger 140.

The plurality of first fastening parts 521 and the plurality of second fastening parts 522 may be provided in the vehicle width direction based on the number of the provided support parts 512. Accordingly, condensate water and air passing through the evaporator 130 may be easily supplied to an entire region in the lower side of the variable heat exchanger 140 in the vehicle width direction.

FIG. 10 is a view showing an example to which the heat pump system of the vehicle air conditioner according to the first exemplary embodiment of the present invention is applied.

The heat pump system may include a compressor 200, a first expansion means 300 and a second expansion means 150 together with the interior heat exchanger 120, the evaporator 130, the variable heat exchanger 140, the fan assembly 161 and the blower part 162, as described above.

First, the compressor 200 may be installed in a refrigerant circulation line L1 in which the refrigerant circulates to compress and discharge the refrigerant.

The interior heat exchanger 120 may be installed in the second air conditioning case 110b to exchange heat between air in the air conditioning case 110, i.e. air-conditioning wind, and the refrigerant discharged from the compressor 200, and may thus perform the air heating by supplying the air-conditioning wind heated as a result of condensation to the interior.

The evaporator 130 may be installed in the second air conditioning case 110b to exchange heat between the air in the second air conditioning case 110b and the refrigerant supplied to the compressor 200, and may thus perform the air cooling by heating the air supplied to the interior by evaporating the low-pressure liquid refrigerant.

The variable heat exchanger 140 may be installed in the first air conditioning case 110a to exchange heat between air and the refrigerant circulated in the refrigerant circulation line L1. The variable heat exchanger 140 may condense the refrigerant in the air cooling, or evaporate the refrigerant in the air heating.

The first expansion means 300 may be installed in the refrigerant circulation line L1 on an outlet side of the interior heat exchanger 120 to selectively expand the refrigerant discharged from the interior heat exchanger 120. During the air heating, the refrigerant may be condensed in the interior heat exchanger 120, the refrigerant may be operated to be evaporated in the variable heat exchanger 140, and the refrigerant may be throttled in a low-temperature and low-pressure state. In addition, during the air cooling, the first expansion means 300 may bypass the refrigerant without throttling.

The second expansion means 150 may be installed in the refrigerant circulation line L1 on an inlet side of the evaporator 130 to expand the refrigerant supplied to the evaporator 130. During the air cooling, the second expansion means 150 may supply the refrigerant condensed while passing through the variable heat exchanger 140 to the evaporator 130 by throttling the refrigerant in the low-temperature and low-pressure state. In addition, during the air heating, the second expansion means 150 may bypass the refrigerant without throttling.

In addition, the vehicle heat pump system may further include a water-cooled condenser 400 installed in the refrigerant circulation line L1 on the inlet side of the first expansion means 300 from the outside of the first air conditioning case 110a and the second air conditioning case 110b and exchanging heat with cooling water for cooling a battery. The water-cooled condenser 400 may be a part where cooling water flows along a cooling water circulation line L2 to perform heat exchange, during the air cooling, and may condense the refrigerant supplied to the evaporator 130 based on the air cooling setting together with the interior heat exchanger 120 and the variable heat exchanger 140. In the cooling water circulation line L2, positioned are a radiator 3000 for cooling water, a cooling water pump (not shown) for circulating cooling water, and a cooling fan 4000 positioned adjacent to the radiator 3000 and blowing air into the radiator 3000. The water-cooled condenser 400 may include a gas-liquid separator 410. In this case, the refrigerant may be condensed by the water-cooled condenser 400, and the liquid refrigerant separated by the gas-liquid separator 410 may be sub-cooled by the variable heat exchanger 140, thereby increasing condensation performance to further improve the air cooling performance of the evaporator 130.

In addition, in the vehicle heat pump system, a bypass line L3 may be positioned on the refrigerant circulation line L1 to bypass the second expansion means 150 and the evaporator 130, and a non-return valve "V" for preventing a reverse flow of the refrigerant may be further positioned on the bypass line L3. During the air heating, the bypass line L3 may allow the refrigerant passing through the variable heat exchanger 140 to be supplied to the compressor 200 without passing through the second expansion means 150 or the evaporator 130. That is, it is possible to prevent unnecessary flow rate reduction and pressure drop during the air heating by omitting unnecessary components (e.g., the second expansion means 150 and the evaporator 130).

Figure 11A:
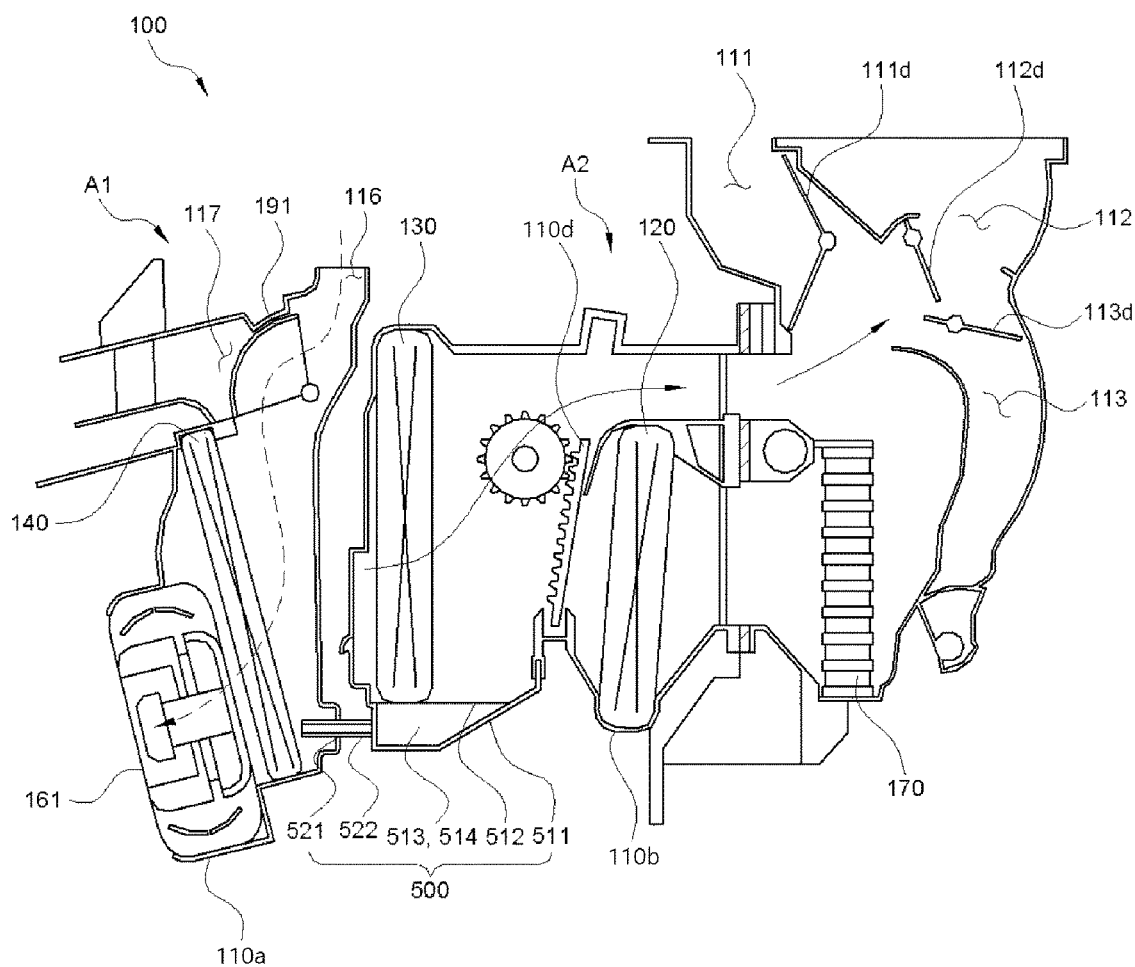
FIGS. 11A, 11B and 12 are views each showing an air cooling mode of the vehicle air conditioner according to the first exemplary embodiment of the present invention.
Figure 11B:
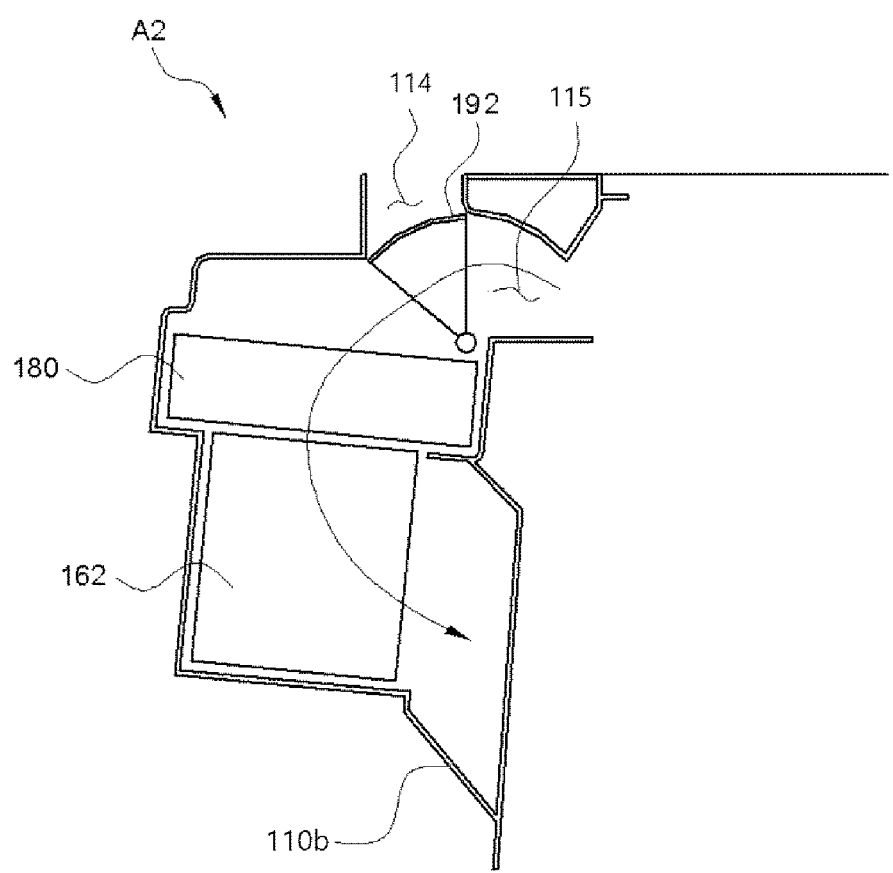
Figure 12:
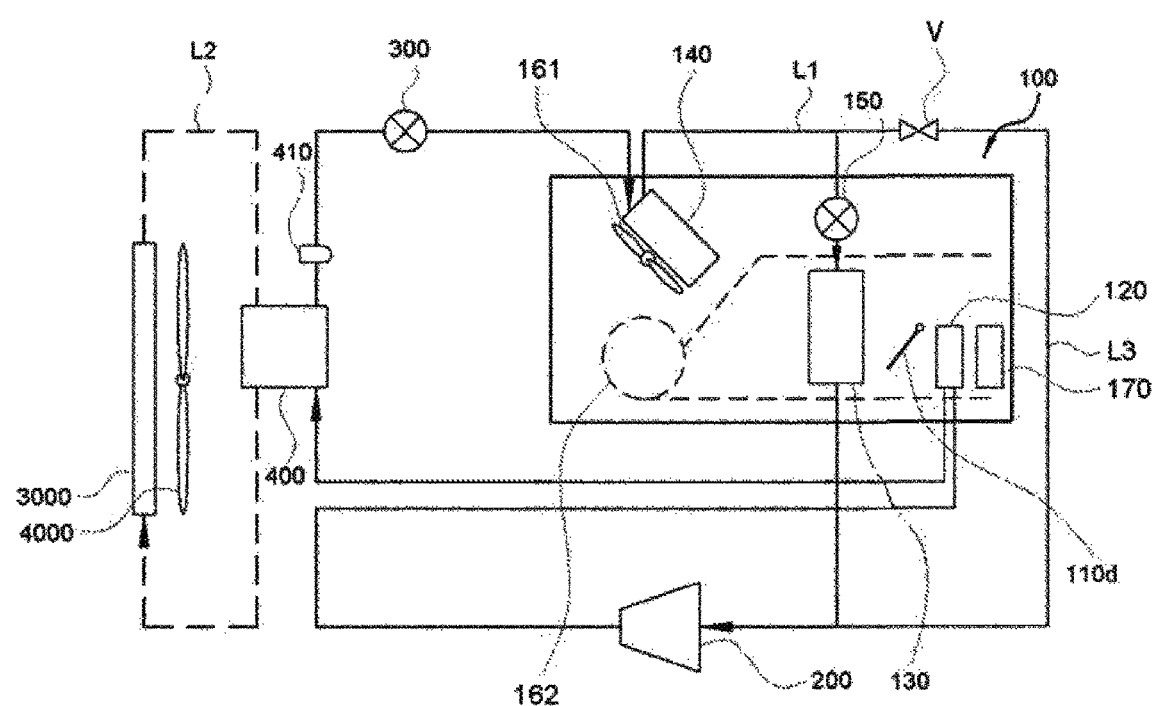

FIGS. 11A, 11B and 12 are views each showing the air cooling mode of the vehicle air conditioner and a mode of the heat pump system according to the first exemplary embodiment of the present invention.

First, during maximum cooling, the refrigerant compressed by the compressor 200 may pass through the interior heat exchanger 120 without exchanging heat with air (because the temp door 110d blocks the flow of air passing through the interior heat exchanger 120) and the high-pressure refrigerant delivered from the compressor 200 may be condensed while passing through the water-cooled condenser 400 and the variable heat exchanger 140. Here, the first expansion means 300 may bypass the refrigerant. The condensed refrigerant may be throttled by the second expansion means 150 and supplied to the evaporator 130, heat may then be exchanged between air and the throttled low-pressure liquid refrigerant in the evaporator 130, and air discharged to the interior may thus be cooled by heat absorption by latent heat released when the refrigerant is evaporated.

Figure 13:
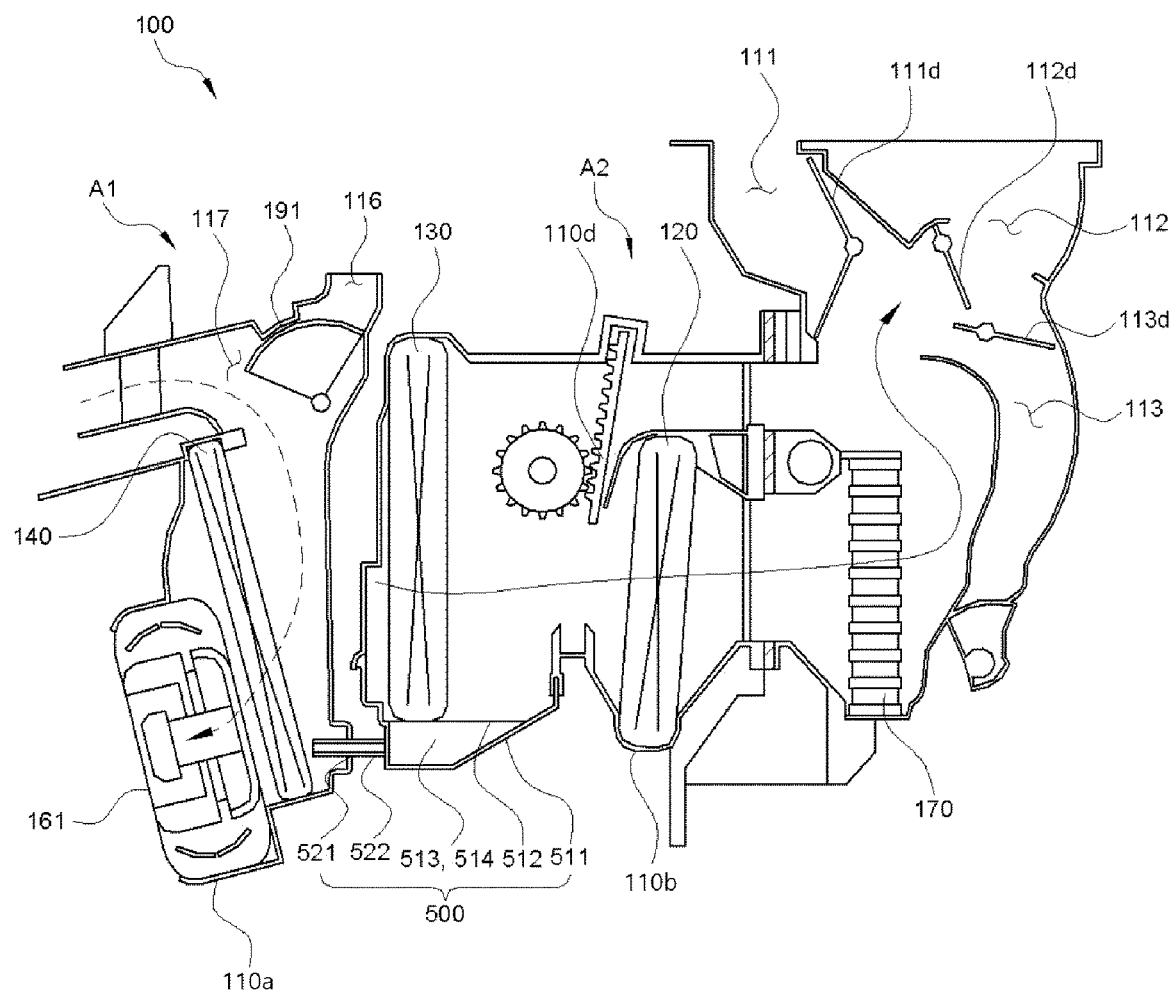
FIGS. 13 and 14 are views showing an air heating mode of the vehicle air conditioner according to the first exemplary embodiment of the present invention.
Figure 14:
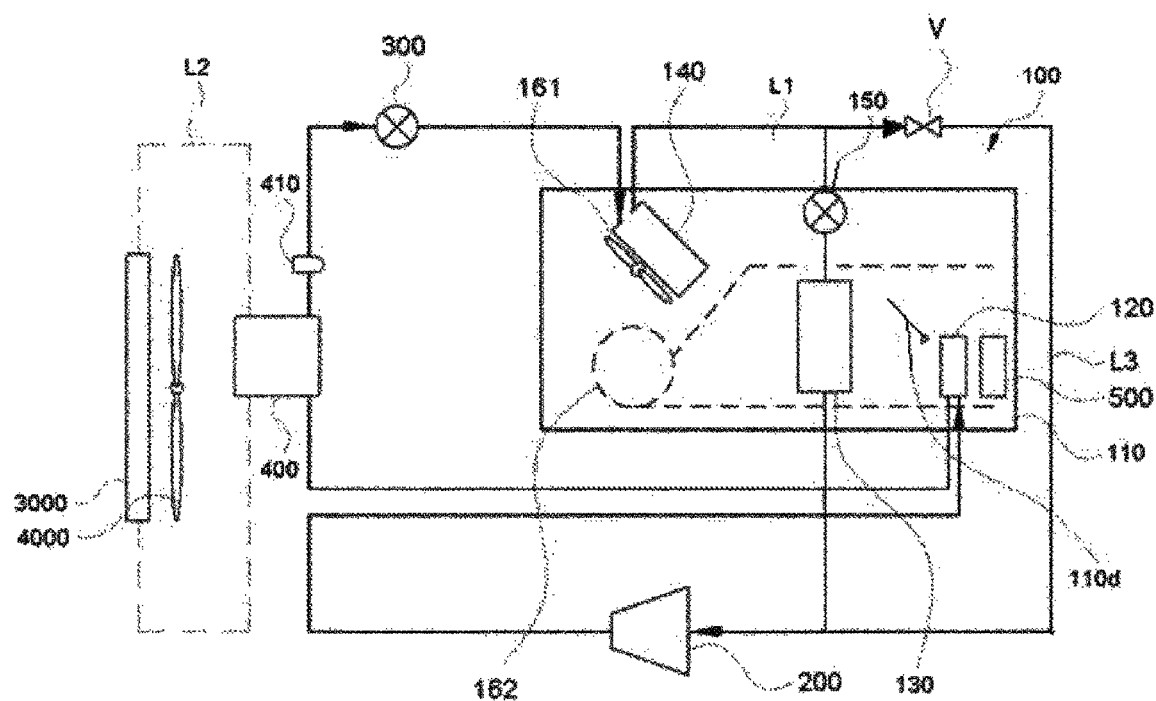

FIGS. 13 and 14 are views showing the air heating mode of the vehicle air conditioner 100 and a mode of the heat pump system according to the first exemplary embodiment of the present invention.

First, during maximum heating, the refrigerant compressed by the compressor 200 may pass through the interior heat exchanger 120 to exchange heat with air passing through the second air conditioning case 110b, thereby heating up air discharged to the interior by heat dissipation by the condensation. Meanwhile, the temp door 110d may be operated so that air introduced into the second air conditioning case 110b passes through the evaporator 130 and then passes through the interior heat exchanger 120 in its entirety. Here, air may pass through without exchanging heat with the evaporator 130 in a state where the refrigerant is not supplied to the evaporator 130. Also in the water-cooled condenser 400, cooling water may not flow along the cooling water circulation line L2, and the refrigerant may be moved without change, throttled in the first expansion means 300, and supplied to the variable heat exchanger 140 to be evaporated. The refrigerant evaporated while passing through the variable heat exchanger 140 may be supplied to the compressor 200 through the bypass line L3 without passing through the second expansion means 150 or the evaporator 130.

In summary, the vehicle air conditioner 100 of the present invention may be the heat pump system, that is, the air conditioner 100 used in an air conditioning system which may perform the air cooling and heating with one refrigerant line. The high-temperature refrigerant compressed by the compressor 200 may be used for the air heating, and the evaporation of refrigerant may be used for the air cooling. Here, a chronic problem of the heat pump system, i.e. lower condensation performance during the air cooling, may be solved by the variable heat exchanger 140 that condenses the refrigerant together with the interior heat exchanger 120. The variable heat exchanger 140 may be mounted in the first air conditioning case 110a.

Second Exemplary Embodiment

Figure 15:
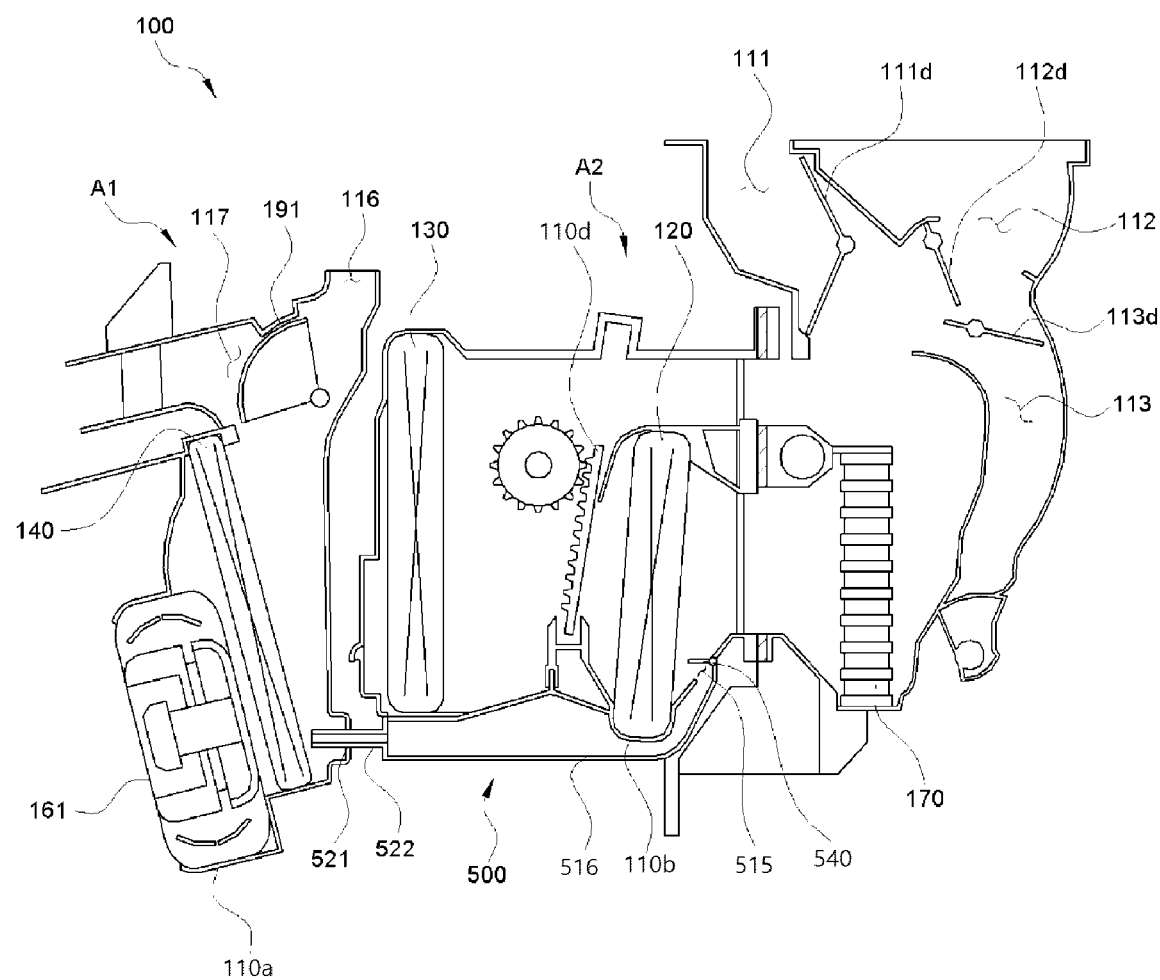
FIG. 15 is a cross-sectional view of a vehicle air conditioner according to a second exemplary embodiment of the present invention in direction AA' shown in FIG. 2.
Figure 16:
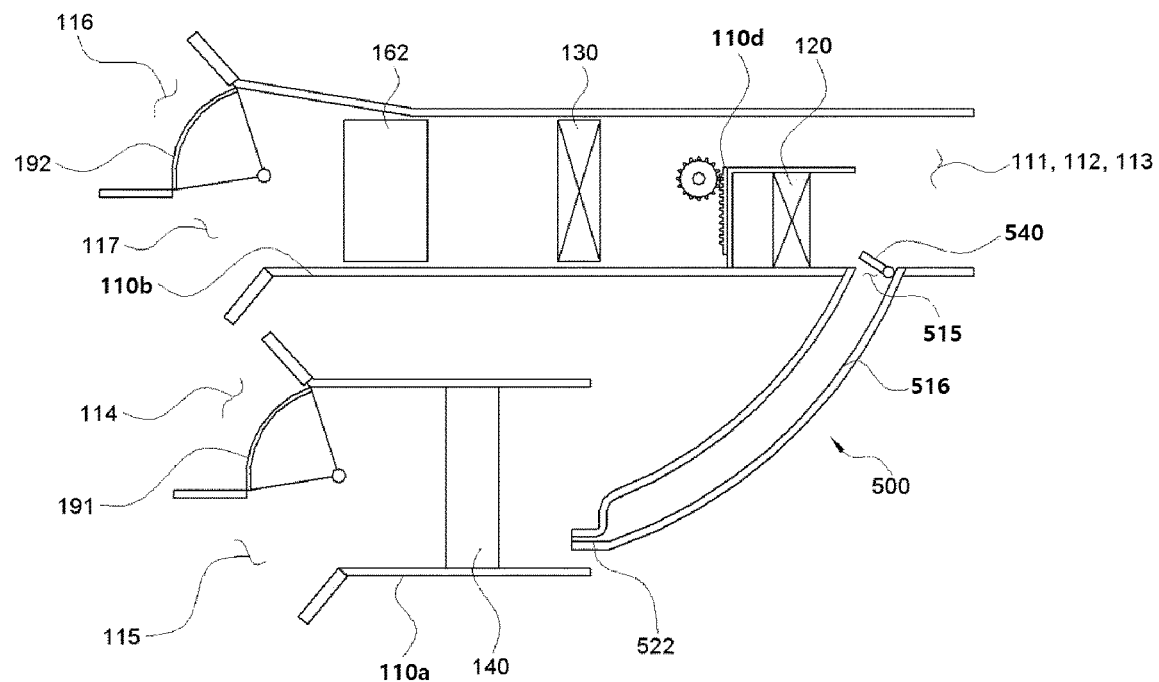
FIG. 16 is a schematic view showing the vehicle air conditioner according to the second exemplary embodiment of the present invention.

FIG. 15 is a cross-sectional view of a vehicle air conditioner according to a second exemplary embodiment of the present invention in direction AA' shown in FIG. 2. In addition, FIG. 16 is a schematic view showing the vehicle air conditioner according to the second exemplary embodiment of the present invention. In addition, the perspective view, exploded perspective view, schematic diagram, and cross-sectional view of the variable heat exchanger according to the second exemplary embodiment of the present invention and an example to which a heat pump system is applied may be the same as those shown in FIGS. 2 to 5 and 7 to 10 of the first exemplary embodiment.

The vehicle air conditioner according to the second exemplary embodiment of the present invention may include a variable heat exchanger 140, an evaporator 130, an interior heat exchanger 120 and a supply part 500.

The variable heat exchanger 140 may condense a refrigerant based on an air cooling setting, or evaporate the refrigerant based on an air-heating setting. That is, the variable heat exchanger 140 may not cool or heat air for actual air cooling or heating, and condense the refrigerant supplied to the evaporator 130 based on the air cooling setting or evaporate the refrigerant supplied to the interior heat exchanger 120 based on the air-heating setting. The description below describes again a flow of the refrigerant based on the air cooling or heating setting of the actual heat pump system and a change in the refrigerant while passing through each component.

The evaporator 130 may cool air discharged to a vehicle interior. Here, when the air cooling is performed, the refrigerant in a wet state of low temperature and low pressure may be supplied to the evaporator 130, and air may be cooled while passing through the evaporator 130 to be discharged to the vehicle interior. On the other hand, when the air heating is performed, the refrigerant may not be supplied to the evaporator 130, such that even though air passes through the evaporator 130, an interior temperature may not be changed.

The interior heat exchanger 120 may be positioned at the rear of the evaporator 130 in a direction in which air-conditioning wind for conditioning interior air flows to heat air discharged to the vehicle interior. That is, the interior heat exchanger 120 may be a component for performing the air heating, and control the air cooling or heating by controlling a flow of air-conditioning wind passing through the interior heat exchanger 120 by using a temp door 110d.

The variable heat exchanger 140, the evaporator 130 and the interior heat exchanger 120 may be positioned in an air conditioning case for configuring the vehicle air conditioner 100. In particular, the present invention may include a first air conditioning case 110a and a second air conditioning case 110b, and a detailed description thereof is given below.

The supply part 500 may be a component for selectively supplying air passing through the interior heat exchanger 120 to the variable heat exchanger 140. Here, the variable heat exchanger 140 may have a "U"-shaped flow, and the supply part 500 may be placed at a position where air passing through the interior heat exchanger 120 is supplied to a certain region in a lower side of the variable heat exchanger 140. In other words, air may be supplied to the lower side of the variable heat exchanger 140, where the refrigerant is discharged, by means of the supply part 500, and may exchange heat with the refrigerant before being discharged, which may increase a heat exchange effect.

For example, the variable heat exchanger 140 may include a pair of header tanks 143 positioned on upper and lower sides in the drawing while being spaced apart from each other by a certain distance, a plurality of tubes 145 connecting the header tanks to each other, and fins 146 interposed therebetween, in which the refrigerant introduced through an upper inlet pipe 141 is moved downward through the plurality of tubes 145, and discharged through a lower outlet pipe 142. For another example, the variable heat exchanger 140 may include the pair of header tanks 143 positioned on left and right sides in the drawing while being spaced apart from each other by a certain distance. Here, the right header tank 143 equipped with the inlet pipe 141 and the outlet pipe 142 may be partitioned by a baffle 144 in a height direction thereof. The refrigerant introduced into an upper region of the right header tank 143 through the inlet pipe 141 may be moved to the left header tank 143 through some of the tubes 145, and moved back to a lower region of the right header tank 143 through the rest tubes 145 and then discharged through the outlet pipe 142. Reference numeral A140 may denote a supply region to which air passing through the interior heat exchanger 120 is supplied by means of the supply part 500, and the supply region A140 of the supply part 500 may be positioned in the lower side of the variable heat exchanger 140. Here, the supply region of the supply unit 500 may be positioned within a range of zero (0) to 35% of the entire variable heat exchanger 140 in the height direction.

As described above, the vehicle air conditioner according to the second exemplary embodiment of the present invention may supply air having a high temperature (higher than an exterior temperature) to the variable heat exchanger 140 to use air as a heat source for absorbing heat of the variable heat exchanger 140 during an air heating mode or a situation where the variable heat exchanger 140 may adhere to the air conditioner. Here, when air passing through the interior heat exchanger 120 is supplied with (interior) air passing through the vehicle interior, air passing through the interior heat exchanger 120 may be usually higher than the exterior temperature by 10° C. or higher. This heat may be used to increase a heat absorption amount of the variable heat exchanger 140, thereby improving its heating performance.

The vehicle air conditioner of the present invention is not limited to any particular type, and may be variously modified as long as air passing through the interior heat exchanger 120 is supplied to the variable heat exchanger 140 by means of the supply part 500. The description below describes an example in which the entire vehicle air conditioner 100 includes a variable heat exchanger module A1 and an air conditioning module A2 assembled to each other.

First, the variable heat exchanger module A1 may include a first air conditioning case 110a, the variable heat exchanger 140 and a fan assembly 161.

The first air conditioning case 110a may be a body of the variable heat exchanger module A1, the variable heat exchanger 140 may be positioned therein, and the fan assembly 161 may be mounted in one side thereof. The first air conditioning case 110a may include a first exterior air inlet 116 which communicates with a vehicle exterior, an engine room air inlet 117 which communicates with an engine room, and a first control door 191 which controls the opening and closing of the first exterior air inlet 116 and the engine room air inlet 117. The first control door 191 may control a flow of air passing through the variable heat exchanger 140 by controlling the opening and closing of the first outdoor air inlet 116 and the engine room air inlet 117 based on the air cooling or heating setting. In particular, in the winter when the exterior temperature is low, the inside of the engine room may be heated by operations of various electronic components and maintain a temperature higher than the exterior temperature. During maximum heating, the variable heat exchanger module A1 of the present invention may supply air in the engine room into the first air conditioning case 110a by the operation of the first control door 191 to increase the evaporation performance (or heat absorption amount) of the variable heat exchanger 140, thereby further improving the air heating performance of the interior heat exchanger 120.

The fan assembly 161 may be positioned in the first air conditioning case 110a and rotated based on the air cooling or heating setting to form the flow of air passing through the variable heat exchanger 140, and may include a fan part including rotor blades, and a motor controlling an operation of the fan part.

The air conditioning module A2 may include a second air conditioning case 110b, a blower part 162, the evaporator 130 and the interior heat exchanger 120.

The second air conditioning case 110b may be a body assembled with the first air conditioning case 110a to form a vehicle air conditioner 100, and may have the blower part 162, the evaporator 130 and the interior heat exchanger 120 built therein. Here, the second air conditioning case 110b may include a second exterior air inlet 114 through which exterior air is introduced, an interior air inlet 115 through which the interior air is introduced, and a second control door 192 which controls the opening and closing of the second exterior air inlet 114 and interior air inlet 115.

In addition, the temp door 110d for allowing air passing through the evaporator 130 to be mixed by passing through the interior heat exchanger 120 based on a temperature setting may be positioned in the second air conditioning case 110b, and vents 111, 112 and 113 for discharging air to the vehicle interior may each be positioned on a side of the second air conditioning case, through which air is discharged to the vehicle interior. In more detail, the vents 111, 112 and 113 each positioned on the side through which air is discharged may be a face vent 111, a defrost vent 112 and a floor vent 113, of which opening degrees are controlled by respective doors 111d, 112d and 113d.

In the vehicle air conditioner of the present invention, a region where the blower part 162 of the air conditioning module A2 is positioned and the variable heat exchanger module A1 may be installed in the engine room to be parallel to each other in a vehicle width direction. That is, the region where air flows by the blower part 162 positioned in the air conditioning module A2 (i.e., region where the second exterior air inlet 114 and the interior air inlet 115 are positioned) may be positioned to be parallel to the variable heat exchanger module A1 in the engine room.

The blower part 162 may be positioned in the second air conditioning case 110b, and may blow air for conditioning air of vehicle interior.

In addition, in the vehicle air conditioner of the present invention, a filter 180 may be further positioned at the rear of the second control door 192 in an air flow direction, and the filter may be replaceable.

In addition, in the vehicle air conditioner of the present invention, an auxiliary heating heat exchanger 170 may be further positioned at the rear of the interior heat exchanger 120 in the air flow direction. The auxiliary heating heat exchanger 170 may perform the air heating together with the interior heat exchanger 120, and use various types including a positive temperature coefficient (PTC) heating means.

The supply part 500 may include a through hole 515, a third control door 540, a communication part 516, a first fastening part 521 and a second fastening part 522 to be easily manufactured by assembling the first air conditioning case 110a of the variable heat exchanger module A1 and the second air conditioning case 110b of the air conditioning module A2 to each other.

The through hole 515, the third control door 540, the communication part 516 and the second fastening part 522 may be positioned in the second air conditioning case 110b, and the first fastening part 521 may be positioned in the first air conditioning case 110a. First, the through hole 515 may be a certain through region of the second air conditioning case 110b positioned at the rear of the interior heat exchanger 120, the third control door 540 may be positioned in the through hole 515 to control the opening and closing of the through hole 515, and the communication part 516 may be a part which is extended from a lower side of the second air conditioning case 110b and to which air passing through the interior heat exchanger 120 is delivered.

The first fastening part 521 may be positioned in the first air conditioning case 110a, the second fastening part 522 may be positioned in the extension part 510 of the second air conditioning case 110b, and the fastening parts may be fastened to each other to supply the variable heat exchanger 140 with air delivered through the through hole 515 and the extension part.

Here, the first fastening part 521 may be a certain through region of the first air conditioning case 110a, and the second fastening part 522 may protrude long from the communication part 516 and may be inserted and fixed into the first air conditioning case 110a through the first fastening part 521. The supply part 500 may be easily manufactured by assembling the first air conditioning case 110a and the second air conditioning case 110b to each other.

The plurality of first fastening parts 521 and the plurality of second fastening parts 522 may be provided in the vehicle width direction. Accordingly, air passing through the interior heat exchanger 120 may be easily supplied to an entire region in the lower side of the variable heat exchanger 140 in the vehicle width direction.

In addition, the vehicle air conditioner 100 according to the second exemplary embodiment of the present invention may be applied to the vehicle heat pump system, and the heat pump system may include a compressor 200, a first expansion means 300 and a second expansion means 150 together with the interior heat exchanger 120, the evaporator 130, the variable heat exchanger 140, the fan assembly 161 and the blower part 162, as described above.

First, the compressor 200 may be installed in a refrigerant circulation line L1 in which the refrigerant circulates to compress and discharge the refrigerant.

The interior heat exchanger 120 may be installed in the second air conditioning case 110b to exchange heat between air in the air conditioning case 110, i.e. air-conditioning wind, and the refrigerant discharged from the compressor 200, and may thus perform the air heating by supplying the air-conditioning wind heated as a result of condensation to the interior.

The evaporator 130 may be installed in the second air conditioning case 110b to exchange heat between the air in the second air conditioning case 110b and the refrigerant supplied to the compressor 200, and may thus perform the air cooling by heating the air supplied to the interior by evaporating the low-pressure liquid refrigerant.

The variable heat exchanger 140 may be installed in the first air conditioning case 110a to exchange heat between air and the refrigerant circulated in the refrigerant circulation line L1. The variable heat exchanger 140 may condense the refrigerant in the air cooling, or evaporate the refrigerant in the air heating.

The first expansion means 300 may be installed in the refrigerant circulation line L1 on an outlet side of the interior heat exchanger 120 to selectively expand the refrigerant discharged from the interior heat exchanger 120. During the air heating, the refrigerant may be condensed in the interior heat exchanger 120, the refrigerant may be operated to be evaporated in the variable heat exchanger 140, and the refrigerant may be throttled in a low-temperature and low-pressure state. In addition, during the air cooling, the first expansion means 300 may bypass the refrigerant without throttling.

The second expansion means 150 may be installed in the refrigerant circulation line L1 on an inlet side of the evaporator 130 to expand the refrigerant supplied to the evaporator 130. During the air cooling, the second expansion means 150 may supply the refrigerant condensed while passing through the variable heat exchanger 140 to the evaporator 130 by throttling the refrigerant in the low-temperature and low-pressure state. In addition, during the air heating, the second expansion means 150 may bypass the refrigerant without throttling.

In addition, the vehicle heat pump system may further include a water-cooled condenser 400 installed in the refrigerant circulation line L1 on the inlet side of the first expansion means 300 from the outside of the first air conditioning case 110*a* and the second air conditioning case 110*b* and exchanging heat with cooling water for cooling a battery. The water-cooled condenser 400 may be a part where cooling water flows along a cooling water circulation line L2 to perform heat exchange, during the air cooling, and may condense the refrigerant supplied to the evaporator 130 based on the air cooling setting together with the interior heat exchanger 120 and the variable heat exchanger 140. In the cooling water circulation line L2, positioned are a radiator 3000 for cooling water, a cooling water pump (not shown) for circulating cooling water, and a cooling fan 4000 positioned adjacent to the radiator 3000 and blowing air into the radiator 3000. The water-cooled condenser 400 may include a gas-liquid separator 410. In this case, the refrigerant may be condensed by the water-cooled condenser 400, and the liquid refrigerant separated by the gas-liquid separator 410 may be sub-cooled by the variable heat exchanger 140, thereby increasing condensation performance to further improve the air cooling performance of the evaporator 130.

In addition, in the vehicle heat pump system, a bypass line L3 may be positioned on the refrigerant circulation line L1 to bypass the second expansion means 150 and the evaporator 130, and a non-return valve "V" for preventing a reverse flow of the refrigerant may be further positioned on the bypass line L3. During the air heating, the bypass line L3 may allow the refrigerant passing through the variable heat exchanger 140 to be supplied to the compressor 200 without passing through the second expansion means 150 or the evaporator 130. That is, it is possible to prevent unnecessary flow rate reduction and pressure drop during the air heating by omitting unnecessary components (e.g., the second expansion means 150 and the evaporator 130).

Figure 17:
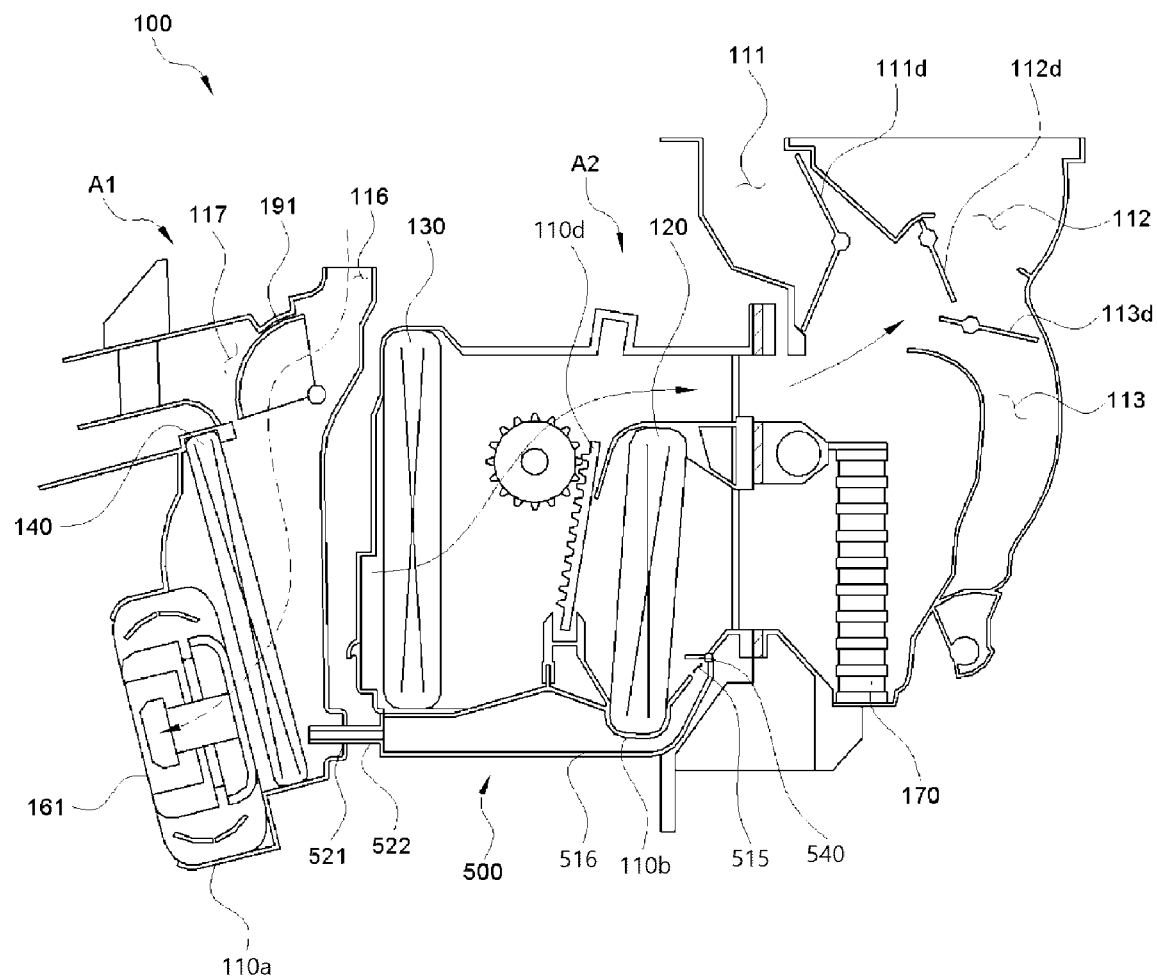
FIG. 17 is a view showing an air cooling mode of the vehicle air conditioner according to the second exemplary embodiment of the present invention.

FIG. 17 is a view showing an air cooling mode of the vehicle air conditioner and a mode of the heat pump system according to the second exemplary embodiment of the present invention.

First, during maximum cooling, the refrigerant compressed by the compressor 200 may pass through the interior heat exchanger 120 without exchanging heat with air (because the temp door 110*d* blocks the flow of air passing through the interior heat exchanger 120) and the high-pressure refrigerant delivered from the compressor 200 may be condensed while passing through the water-cooled condenser 400 and the variable heat exchanger 140. Here, the first expansion means 300 may bypass the refrigerant. The condensed refrigerant may be throttled by the second expansion means 150 and supplied to the evaporator 130, heat may then be exchanged between air and the throttled low-pressure liquid refrigerant in the evaporator 130, and air discharged to the interior may thus be cooled by heat absorption by latent heat released when the refrigerant is evaporated.

Here, the description shows an example in which the temp door 110*d* is controlled to be positioned to block air from being moved toward the interior heat exchanger 120, and the third control door 540 is opened. However, the third control door 540 may be closed during the air cooling.

Figure 18:
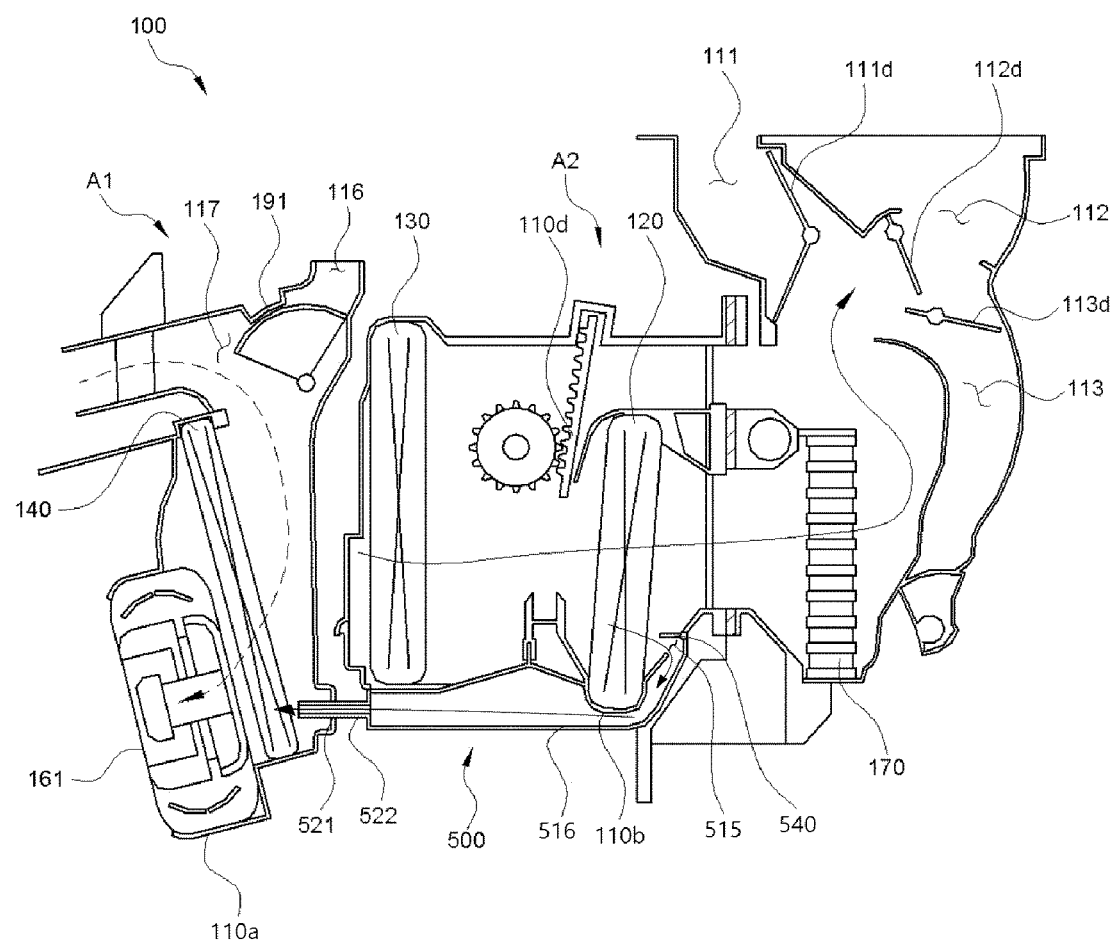
FIG. 18 is a view showing an air heating mode of the vehicle air conditioner according to the second exemplary embodiment of the present invention.

FIG. 18 is a view showing an air heating mode of the vehicle air conditioner 100 and a mode of the heat pump system according to the second exemplary embodiment of the present invention.

First, during maximum heating, the refrigerant compressed by the compressor 200 may pass through the interior heat exchanger 120 to exchange heat with air passing through the second air conditioning case 110*b*, thereby heating up air discharged to the interior by heat dissipation by the condensation. Meanwhile, the temp door 110*d* may be operated so that air introduced into the second air conditioning case 110*b* passes through the evaporator 130 and then passes through the interior heat exchanger 120 in its entirety. Here, air may pass through without exchanging heat with the evaporator 130 in a state where the refrigerant is not supplied to the evaporator 130. Also in the water-cooled condenser 400, cooling water may not flow along the cooling water circulation line L2, and the refrigerant may be moved without change, throttled in the first expansion means 300, and supplied to the variable heat exchanger 140 to be evaporated. The refrigerant evaporated while passing through the variable heat exchanger 140 may be supplied to the compressor 200 through the bypass line L3 without passing through the second expansion means 150 or the evaporator 130.

In summary, the vehicle air conditioner 100 of the present invention may be the heat pump system, that is, the air conditioner 100 used in an air conditioning system which may perform the air cooling and heating with one refrigerant line. The high-temperature refrigerant compressed by the compressor 200 may be used for the air heating, and the evaporation of refrigerant may be used for the air cooling. Here, a chronic problem of the heat pump system, i.e. lower condensation performance during the air cooling, may be solved by the variable heat exchanger 140 that condenses the refrigerant together with the interior heat exchanger 120. The variable heat exchanger 140 may be mounted in the first air conditioning case 110*a*.

Figure 19:
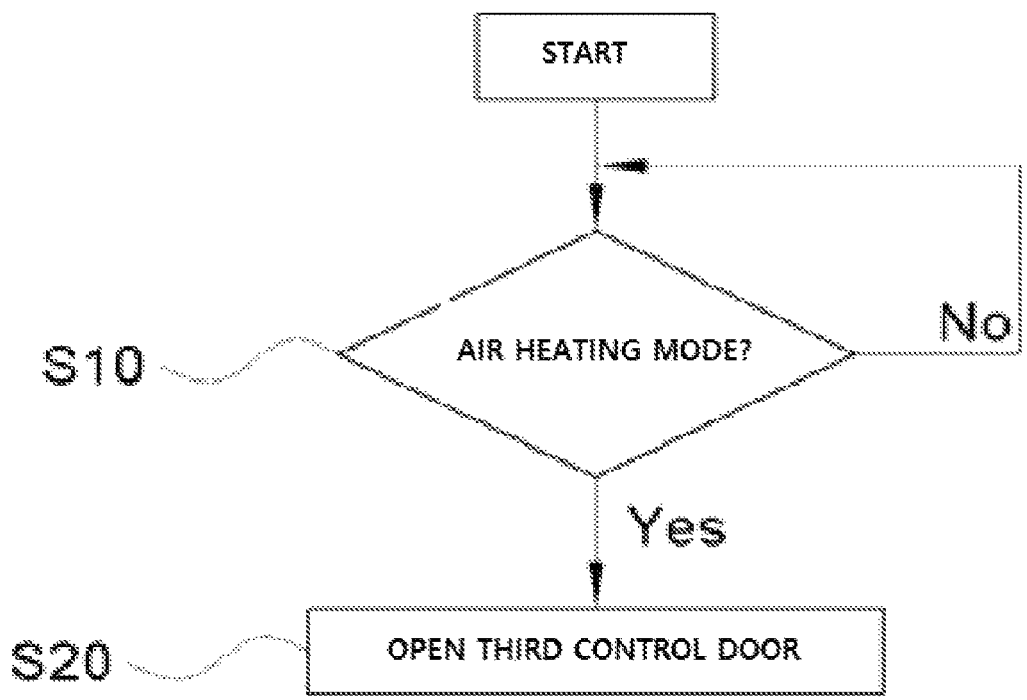
FIGS. 19 and 20 are views each showing a control method for the vehicle air conditioner according to the second exemplary embodiment of the present invention.
Figure 20:
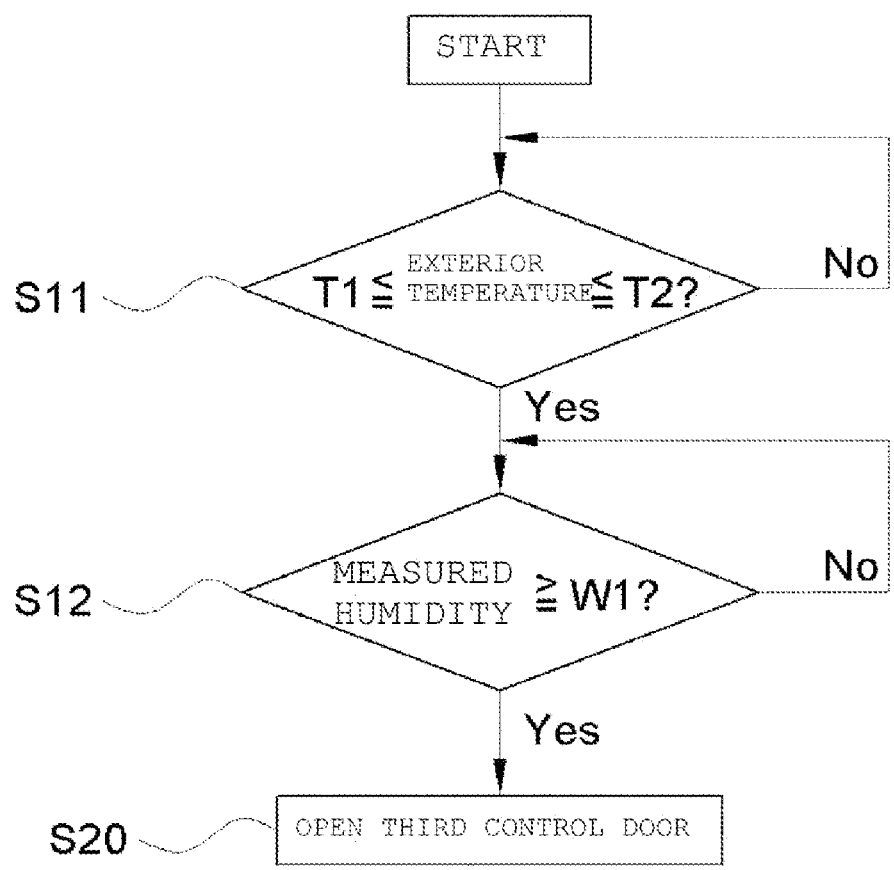

FIGS. 19 and 20 are views each showing a control method for the vehicle air conditioner according to the second exemplary embodiment of the present invention. The control method for the vehicle air conditioner of the present invention may have features of the vehicle air conditioner as described above, and includes determining whether the third control door 540 needs to be opened (S10); and opening the third control door 540 (S20).

First, in the case shown in FIG. 19, in the determining, it may be determined that the third control door 540 needs to be opened when an air heating setting is confirmed. That is, in the control method for a vehicle air conditioner of the present invention, air passing through the interior heat exchanger 120 may be selectively supplied to the variable heat exchanger 140 to be used as a heat-absorbing heat source during air heating.

In addition, in the case shown in FIG. 20, it is possible to determine a possibility in which the adhesion of the variable heat exchanger 140 occurs, thereby preventing the adhesion of the variable heat exchanger 140 by the heat source supplied by means of a supply part 500. In more detail, the determining to determine the possibility in which the adhesion of the variable heat exchanger 140 occurs may include: checking whether an exterior temperature is within a certain temperature range (S11); and checking whether a measured humidity is equal to or greater than certain humidity (S12). The certain temperature range may be a predetermined temperature, for example, T1=−5° C. and T2=5° C., and the certain humidity may also be a predetermined humidity range.

That is, the description describes an example in which according to the control method for a vehicle air conditioner of the present invention shown in FIG. 20, when it is determined that the adhesion of the variable heat exchanger may occur, it is possible to prevent the adhesion of the variable heat exchanger 140 by using air passing through the interior heat exchanger 120 by opening the third control door 530.

The present invention is not limited to the above-mentioned embodiments, and may be variously applied. In addition, the present invention may be variously modified by those skilled in the art to which the present invention pertains without departing from the gist of the present invention claimed in the claims.

[Description of Reference Numerals]

100: vehicle air conditioner
A1: variable heat exchanger module, A2: air conditioning module,
110a: first air conditioning case, 110b: second air conditioning case,
110d: temp door, 111: face vent, 111d: face vent door,
112: defrost vent, 112d: defrost vent door,
113: floor vent, 113d: floor vent door,
114: second exterior air inlet, 115: interior air inlet, 116: first exterior air inlet,
117: engine room air inlet, 120: interior heat exchanger, 130: evaporator,
140: variable heat exchanger, 141: inlet pipe, 142: outlet pipe,
143: header tank, 144: baffle, 145: tube, 146: fin,
A140: supply region of supply part, 150: second expansion means,
161: fan assembly, 162: blower part, 170: auxiliary heating heat exchanger,
180: filter, 191: first control door, 192: second control door,
200: compressor, 300: first expansion means, 400: water-cooled condenser,
410: gas-liquid separator, 500: supply part, 510: extension part,
511: inclined surface, 512: support part, 513: first inclined part,
514: second inclined part, 515: through hole, 516: communication part,
521: first fastening part, 522: second fastening part, 530: discharge part,
540: third control door, 3000: radiator, 4000: cooling fan.

The invention claimed is:

1. A vehicle air conditioner which is an air conditioner having an interior heat exchanger for air heating, a variable heat exchanger for condensing a refrigerant during air cooling and evaporating the refrigerant during air heating and an evaporator for the air cooling built therein, in a refrigerant loop configured of a compressor, the interior heat exchanger, a first expansion device, the variable heat exchanger, a second expansion device and the evaporator, the air conditioner comprising a supply part for supplying air passing through the evaporator and condensate water generated in the evaporator to the variable heat exchanger.

2. The air conditioner of claim 1, wherein in the vehicle air conditioner, a certain region of the variable heat exchanger is positioned below the evaporator in a height direction.

3. The air conditioner of claim 2, wherein in the vehicle air conditioner, condensate water and air are supplied to a side of the variable heat exchanger, where the refrigerant is discharged, by means of the supply part.

4. The air conditioner of claim 1, wherein the vehicle air conditioner includes a variable heat exchanger module and an air conditioning module assembled and fixed to each other,
the variable heat exchanger module including a first air conditioning case, the variable heat exchanger which is positioned in the first air conditioning case, and a fan assembly which is mounted in the first air conditioning case to deliver wind, and
the air conditioning module including a second air conditioning case which communicates with a vehicle interior and in which wind for conditioning interior air flows, a blower part which is positioned in the second air conditioning case to deliver wind, the evaporator and the interior heat exchanger.

5. The air conditioner of claim 4, wherein in the first air conditioning case, a discharge part through which condensate water is discharged is positioned at a lower side of the variable heat exchanger.

6. The air conditioner of claim 5, wherein in the variable heat exchanger module, positioned are a first exterior air inlet through which exterior air is introduced into the first air conditioning case, an engine room air inlet which communicates with an engine room, and a first control door which controls the opening and closing of the first exterior air inlet and the engine room air inlet.

7. The air conditioner of claim 5, wherein in the air conditioning module, positioned are a second exterior air inlet through which exterior air is introduced into the second air conditioning case, an interior air inlet through which the interior air is introduced, and a second control door which controls the opening and closing of the second exterior air inlet and interior air inlet.

8. The air conditioner of claim 7, wherein the air conditioning module further includes a filter positioned downstream of the second control door in an air flow direction.

9. The air conditioner of claim 5, wherein the air conditioning module further includes an auxiliary heating heat exchanger positioned downstream of the interior heat exchanger in an air flow direction.

10. The air conditioner of claim 4, wherein in the vehicle air conditioner, a region where the blower part of the air conditioning module is positioned and the variable heat exchanger module are mounted in an engine room to be parallel to each other in a vehicle width direction.

11. The air conditioner of claim 4, wherein the supply part includes
an extension part which is extended from the second air conditioning case and to which condensate water and air are delivered, and
a first fastening part and a second fastening part respectively positioned in the first air conditioning case and the extension part to be fastened to each other.

12. The air conditioner of claim 11, wherein the extension part includes an inclined surface extended from the second air conditioning case below the evaporator while being inclined downward in a vehicle height direction, a support part protruding from the inclined surface to support a lower side of the evaporator, and a first inclined part and a second inclined part obliquely connecting the support part and the inclined surface to each other, respectively on both sides of the support part in the vehicle width direction.

13. The air conditioner of claim 11, wherein in the supply part, the first fastening part has a certain through region, and the second fastening part protrudes from the extension part to be inserted and fixed into the variable heat exchanger module through the first fastening part.

14. The air conditioner of claim 13, wherein the first fastening part and the second fastening part are provided in plurality, and the plurality of first fastening parts and the plurality of second fastening parts are spaced apart from each other, respectively, in the vehicle width direction.

15. The air conditioner of claim 1, wherein the supply part selectively supplies air passing through the interior heat exchanger to the variable heat exchanger.

16. The air conditioner of claim 15, wherein in the vehicle air conditioner, air passing through the interior heat exchanger is supplied by means of the supply part to be used as a heat-absorbing heat source during the air heating or when the variable heat exchanger adheres thereto.

17. The air conditioner of claim 15, wherein the vehicle air conditioner includes a variable heat exchanger module and an air conditioning module assembled and fixed to each other, the variable heat exchanger module including a first air conditioning case, the variable heat exchanger which is positioned in the first air conditioning case, and a fan assembly which is mounted in the first air conditioning case to deliver wind, and the air conditioning module including a second air conditioning case which communicates with a vehicle interior and in which wind for conditioning interior air flows, a blower part which is positioned in the second air conditioning case to deliver wind, the evaporator and the interior heat exchanger, and the supply part includes a through hole which is a certain through region of the second air conditioning case, a third control door which controls the opening and closing of the through hole, a communication part which communicates with the through hole and delivers air passing through the interior heat exchanger, and first and second fastening parts and which are respectively positioned in the first air conditioning case and the communication part to be fastened to each other.

18. A control method for the vehicle air conditioner as claimed in claim 17, the method comprising:

determining whether the third control door needs to be opened; and opening the third control door.

19. The control method for the vehicle air conditioner of claim 18, wherein in the determining, it is determined that the third control door needs to be opened when an air heating setting is confirmed.

20. The control method for the vehicle air conditioner of claim 18, wherein in the determining, it is determined whether the third control door needs to be opened, by including checking whether an exterior temperature is within a certain temperature range; and checking whether a measured humidity is equal to or greater than certain humidity.

* * * * *